United States Patent
Truchan et al.

(10) Patent No.: US 10,826,867 B2
(45) Date of Patent: Nov. 3, 2020

(54) SIMPLIFIED WIRELESS CONNECTIVITY FOR A CELLULAR COMMUNICATIONS SYSTEM

(71) Applicant: Telefonaktiebolaget LM Ericsson (publ), Stockholm (SE)

(72) Inventors: Catherine Truchan, Lorraine (CA); Peyman Talebi Fard, Vancouver (CA); Stere Preda, Longueuil (CA); Suresh Krishnan, Suwanee, GA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 63 days.

(21) Appl. No.: 16/067,224

(22) PCT Filed: Jan. 5, 2017

(86) PCT No.: PCT/IB2017/050042
§ 371 (c)(1),
(2) Date: Jun. 29, 2018

(87) PCT Pub. No.: WO2017/118935
PCT Pub. Date: Jul. 13, 2017

(65) Prior Publication Data
US 2019/0020617 A1   Jan. 17, 2019

Related U.S. Application Data

(60) Provisional application No. 62/276,712, filed on Jan. 8, 2016.

(51) Int. Cl.
*H04L 29/12*   (2006.01)
*H04W 4/70*   (2018.01)
(Continued)

(52) U.S. Cl.
CPC ........ *H04L 61/103* (2013.01); *H04L 61/2007* (2013.01); *H04W 4/70* (2018.02);
(Continued)

(58) Field of Classification Search
CPC . H04L 61/103; H04L 61/2007; H04L 67/125; H04L 61/2092; H04W 88/10;
(Continued)

(56) References Cited

U.S. PATENT DOCUMENTS 9,204,416 B2 * 12/2015 Sugimoto ............... H04L 12/66
9,369,378 B2 *  6/2016 Skog ....................... H04W 4/70
(Continued)

FOREIGN PATENT DOCUMENTS

WO    2012115551 A1    8/2012

OTHER PUBLICATIONS

Author Unknown, "Technical Specification Group Services and System Aspects; Study on architecture enhancements for Cellular Internet of Things (Release 13)," Technical Report 23.720, Version 13.0.0, 3GPP Organizational Partners, Mar. 2016, 94 pages.
(Continued)

*Primary Examiner* — Brian T O Connor
(74) *Attorney, Agent, or Firm* — Patent Portfolio Builders, PLLC

(57) ABSTRACT

Systems and methods relating to an efficient communication system to, e.g., support Massive Machine Type Communication (M-MTC) devices are disclosed. In some embodiments, a base station in a cellular communications network comprises, during initial attachment of a wireless device, establishing a Data Radio Bearer (DRB) between the base station and the wireless device, updating a context of the wireless device to include information regarding the DRB established between the base station and the wireless device to thereby provide a mapping between the DRB and a
(Continued)

*IP Connectivity as perceived by the UE through SCF* cellular network identifier of the wireless device. The method further comprises, during initial attachment of the wireless device, providing, to the wireless device, at least a portion of an Internet Protocol (IP) address assigned to the wireless device and updating the context of the wireless device to include the at least a portion of the IP address of the wireless device.

19 Claims, 22 Drawing Sheets

(51) Int. Cl.
| | |
|---|---|
| *H04W 76/16* | (2018.01) |
| *H04W 76/27* | (2018.01) |
| *H04W 8/26* | (2009.01) |
| *H04W 68/02* | (2009.01) |
| *H04W 88/10* | (2009.01) |
| *H04L 29/08* | (2006.01) |

(52) U.S. Cl.
CPC ............. *H04W 8/26* (2013.01); *H04W 68/02* (2013.01); *H04W 76/16* (2018.02); *H04W 76/27* (2018.02); *H04W 88/10* (2013.01); *H04L 61/2092* (2013.01); *H04L 67/125* (2013.01); *H04W 8/265* (2013.01)

(58) Field of Classification Search
CPC ....... H04W 68/02; H04W 8/26; H04W 76/27; H04W 76/16; H04W 4/70; H04W 8/265
See application file for complete search history.

(56) References Cited

U.S. PATENT DOCUMENTS

| | | | | |
|---|---|---|---|---|
| 9,716,653 | B2* | 7/2017 | Gage | H04W 76/10 |
| 2013/0208703 | A1* | 8/2013 | Sugimoto | H04L 12/66 |
| | | | | 370/331 |
| 2013/0212236 | A1 | 8/2013 | Foti et al. | |
| 2016/0142321 | A1* | 5/2016 | Gage | H04L 47/2483 |
| | | | | 370/235 |
| 2017/0231018 | A1* | 8/2017 | Hahn | H04W 76/10 |
| 2018/0139651 | A1* | 5/2018 | Kim | H04L 5/00 |

OTHER PUBLICATIONS

Author Unknown, "Technical Specification Group Services and System Aspects; Study on Core Network Overload (CNO) solutions (Release 12)," Technical Report 23.843, Version 12.0.0, 3GPP Organizational Partners, Dec. 2013, 48 pages.
Author Unknown, "Technical Specification Group Services and System Aspects; Study on Machine-Type Communications (MTC) and other mobile data applications communications enhancements (Release 12)," Technical Report 23.887, Version 12.0.0, 3GPP Organizational Partners, Dec. 2013, 151 pages.
Author Unknown, "Technical Specification Group Services and System Aspects; Study on Enhancements to Machine-Type Communications (MTC) and other Mobile Data Applications; Radio Access Network (RAN) aspects (Release 12)," Technical Report 37.869, Version 12.0.0, 3GPP Organizational Partners, Sep. 2013, 43 pages.
Author Unknown, "Technical Specification Group Services and System Aspects; Service requirements for Machine-Type Communication (MTC); Stage 1 (Release 13)," Technical Specification 22.368, Version 13.1.0, 3GPP Organizational Partners, Dec. 2014, 26 pages.
Author Unknown, "Technical Specification Group Services and System Aspects; General Packet Radio Service (GPRS) enhancements for Evolved Universal Terrestrial Radio Access Network (E-UTRAN) access (Release 13)," Technical Specification 23.401, Version 13.5.0, 3GPP Organizational Partners, Dec. 2015, 337 pages.
Author Unknown, "Technical Specification Group Services and System Aspects; Architecture enhancements to facilitate communications with packet data networks and applications (Release 13)," Technical Specification 23.682, Version 13.1.0, 3GPP Organizational Partners, Mar. 2015, 35 pages.
Author Unknown, "Technical Specification Group Core Network and Terminals; 3GPP Evolved Packet System (EPS); Evolved General Packet Radio Service (GPRS); Tunnelling Protocol for Control plan (GTPv2-C); Stage 3 (Release 13)," Technical Specification 29.274, Version 13.4.0, 3GPP Organizational Partners, Dec. 2015, 341 pages.
AT&T, "AT&T Approved 3G 4G Modules," http://www.att.com/modules, last accessed Jan. 8, 2016, 28 pages.
Cisco, "Service Provider Wi-Fi Networks: Scaling Signaling Transactions," White Paper, Last Updated: Oct. 22, 2014, Document ID: 1458684082169765, https://www.cisco.com/c/en/us/solutions/collateral/service-provider/service-provider-wi-fi/white-paper-c11-731038.html, retrieved Jun. 22, 2018, 20 pages.
Ericsson, "Ericsson Mobility Report Jun. 2015," Copyright Ericsson AB, Jun. 2015, https://www.ericsson.com/assets/local/mobility-report/documents/2015/ericsson-mobility-report-june-2015.pdf, retrieved Jun. 26, 2018, 28 pages.
Gallager, Robert G., "Stochastic Processes: Theory for Applications," Preliminary Draft, Cambridge University Press, Mar. 18, 2013, 693 pages.
Huang, J. et al., "An In-Depth Study of LTE: Effect of Network Protocol and Application Behavior on Performance," Proceedings of the ACM SIGCOMM 2013 conference on SIGCOMM (SIGCOMM'13), Hong Kong, China, Aug. 12-16, 2013, pp. 363-374.
Korhonen, J. et al., "Evolving the 3GPP bearer model towards multiple IPv6 prefixes and next-hop routers," Telecommunication Systems, vol. 59, Issue 2, Jun. 2015, pp. 193-209.
Korhonen, J. et al., "IPv6 for Third Generation Partnership Project (3GPP) Cellular Hosts," The Internet Engineering Task Force (IETF) Trust, RFC: 7066, Category: Informational, ISSN: 2070-1721, Nov. 2013, 20 pages.
Krishnan, S. et al., "Simple Procedures for Detecting Network Attachment in IPv6," The Internet Engineering Task Force (IETF) Trust, RFC: 6059, Category: Standards Track, ISSN: 2070-1721, Nov. 2010, 19 pages.
Ksentini, A. et al., "Congestion-Aware MTC Device Triggering," 2014 IEEE International Conference on Communications (ICC), Sydney, NSW, 2014, pp. 294-298.
Narten, T. et al., "Neighbor Discovery for IP version 6 (IPv6)," The Internet Engineering Task Force (IETF) Trust, Network Working Group, RFC: 4861, Obsoletes: 2461, Category: Standards Track, Sep. 2007, 97 pages.
NGMN, "A Deliverable by the NGMN Alliance: NGMN 5G White Paper," Next Generation Mobile Networks Ltd., Mar. 2015, https://www.ngmn.org/fileadmin/ngmn/content/downloads/Technical/2015/NGMN_5G_White_Paper_V1_0.pdf, retrieved Jun. 26, 2018, 125 pages.
OECD, "Machine-to-Machine Communications: Connecting Billions of Devices," OECD Digital Economy Papers, No. 192, OECD Publishing, Paris, Jan. 30, 2012, 45 pages.
Rajan, A. S. et al., "Understanding the bottlenecks in Virtualizing Cellular Core Network Functions," 21st IEEE International Workshop on Local and Metropolitan Area Networks, Beijing, 2015, 6 pages.
Sama, M. R. et al., "Enabling Network Programability in LTE/EPC Architecture Using OpenFlow," 12th International Symposium on Modeling and Optimization in Mobile, Ad Hoc, and Wireless Networks (WiOpt 2014), IFIP, 2014, pp. 395-402.
Taleb, Tarik et al., "On alleviating MTC overload in EPS," Ad Hoc Networks vol. 18, Jun. 2014, available online Mar. 25, 2013, pp. 24-39.
Talebifard, Peyman et al., "Simplified Wireless Connectivity for 5G Machine Type Communication," IEEE INFOCOM International

(56) References Cited

OTHER PUBLICATIONS

Workshop on Mobility Management in the Networks of the Future World, Apr. 10-14, 2016, San Francisco, CA, USA, IEEE, 6 pages.
Thompson, S. et al., "IPv6 Stateless Address Autoconfiguration," The Internet Engineering Task Force (IETF) Trust Network Working Group, RFC: 4862, Obsoletes: 2462, Category: Standards Track, Sep. 2007, 30 pages.
International Search Report and Written Opinion for International Patent Application No. PCT/IB2017/050042, dated Mar. 16, 2017, 14 pages.

* cited by examiner

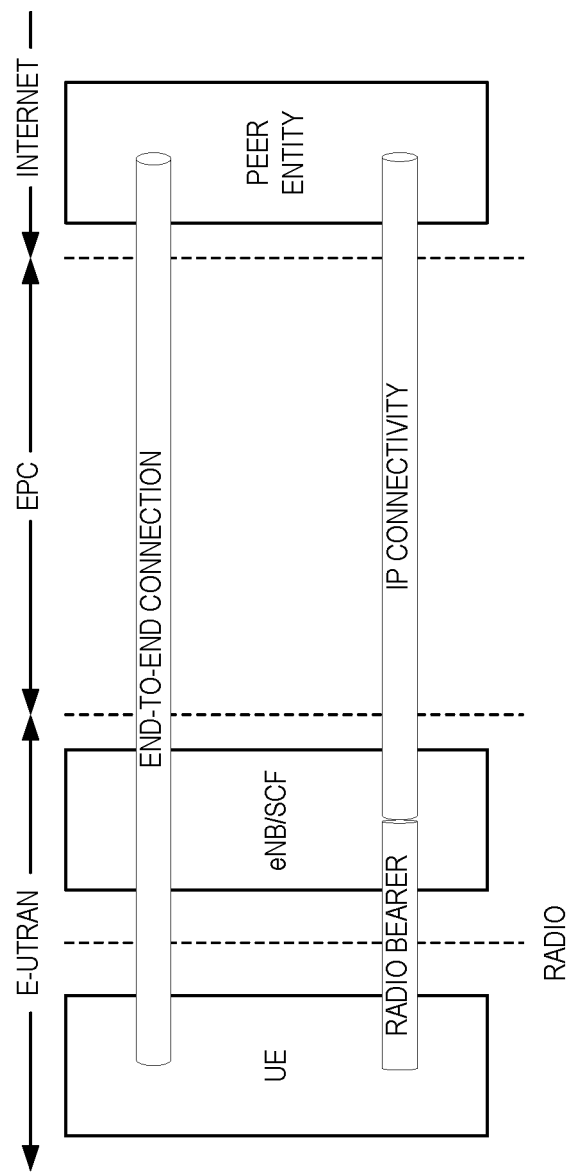
FIG. 2. IP Connectivity as perceived by the UE through SCF

SIMPLIFIED WIRELESS CONNECTIVITY FOR A CELLULAR COMMUNICATIONS SYSTEM

RELATED APPLICATIONS

This application is a 35 U.S.C. § 371 national phase filing of International Application No. PCT/IB2017/050042, filed Jan. 5, 2017, which claims the benefit of provisional patent application Ser. No. 62/276,712, filed Jan. 8, 2016, the disclosures of which are hereby incorporated herein by reference in their entireties.

TECHNICAL FIELD

The present disclosure relates to a cellular communications system and, in particular, to a cellular communications system providing simplified wireless connectivity, e.g., for User Equipments (UEs) such as, e.g., low-mobility wireless devices such as, e.g., Machine Type Communication (MTC) devices.

BACKGROUND

Ubiquity of applications supporting the networked society demands an efficient communication system to support Machine Type Communication (MTC) devices. MTC devices and applications operate with a different pattern of communication that imposes excessive signaling loads that cannot be easily handled by the existing architectures.

There has been a considerable amount of research work related to the challenge of sustaining the traffic growth from large sets of diverse mobile devices and communication patterns. Within the present disclosure, this challenge is referred to as the 26B challenge (see [1]). A considerable amount of research work related to the 26B challenge context falls into the category of Radio Access Network (RAN) overload and congestion control. A set of RAN enhancements are proposed in Third Generation Partnership Project (3GPP) Technical Report (TR) 37.869 V12.0.0 pertaining to Small Data Transmission (SDT). Some of the proposals are specifically targeted to reduce the signaling overhead bytes over the air interface with direct impact on the User Equipment device (UE) technology (e.g., small data transfer using Radio Resource Control (RRC) messages). Simplification of RAN related procedures motivates research efforts towards simplification of packet core and relevant procedures. As an example, a series of Evolved Packet Core (EPC) congestion scenarios with potential solutions and recommendations are proposed in 3GPP TR 23.843 V12.0.0. Additionally, 3GPP TR 23.720, Study on architecture enhancements for Cellular Internet of Things V13.0.0, 2016, provides a study of architecture enhancements and simplifications for constrained Internet of Things devices also referred to as Cellular IoT (CIoT).

To address some of the challenges observed in the proposed architecture of 3GPP Technical Specification (TS) 23.682 V13.1.0 related to the overload of signaling, the authors of [7] propose a congestion mechanism to be implemented by the Mobility Management Entity (MME). The authors of [7] have identified the challenges caused by a high rate of MTC triggering via the Service Capability Server (SCS) and the MTC Interworking Function (MTC-IWF) that can lead to MME overload. Therefore, a congestion mechanism implying a direct notification from the MME to the MTC-IWF is proposed in [7]. This should further be used by the MTC-IWF to reject or aggregate MTC triggering events.

Another approach to increase the MME capacity as suggested in [11] is profiling UEs and MTC devices into classes and processing their signaling through aggregation schemes. The authors of [11] propose a mechanism to handle many Information Elements (IEs) into a "profile IE" associated to a certain group of devices. This yields the observation that many IEs in MME messages are potentially common for MTC devices in the same group. Although the main drawback of this scheme is identified as being the increased processing time by the message aggregator, it turns out that the MME has to process fewer messages. Furthermore, it is proposed in [11] that the MTC-IWF be directly involved in paging low mobility MTC devices. The MTC-IWF sends paging requests to the enhanced Node B (eNB) after receiving "low-mobility UE" information from the Home Subscriber Server (HSS).

Network programmability paradigms have also been proposed to alleviate the signaling of the EPC control plane. Not directly related to the MTC applications, the work in [9] brings in OpenFlow to replace the MME eNB and the MME Serving Gateway (S-GW) control protocols. In [10], the authors explore the problem of packet core virtualization and show how the user plane capacity is impacted by the S-GW, especially when it has to handle high rates of control plane packets. The other category of solutions is based on the objective of optimized routing. As an example, a new bearer model is proposed in [8] that shows potential impact on the signaling. There is a new evolved bearer concept described that considers associating up to three Internet Protocol (IP) version 6 (IPv6) addresses to the default bearer, addresses that identify the breakout point, that is the eNB, the S-GW, or the Packet Data Network (PDN) Gateway (P-GW). This would correspond to a simplified Radio Access Bearer (RAB) management setup procedure. Therefore, Packet Data Convergence Protocol (PDCP) needs to be modified so that the new PDCP Protocol Data Unit (PDU) types are to be defined and mapped to the IPv6 addresses. The eNB would use this information to redirect traffic quickly without an IP lookup.

Ubiquity of applications supporting the networked society demands an efficient communication system to support MTC devices. MTC devices and applications operate with a different pattern of communication that imposes excessive signaling loads that cannot be easily handled by the existing architectures. Thus, there is a need for systems and methods that mitigate or avoid the excessive signaling loads related to MTC devices and applications.

SUMMARY

Systems and methods relating to an efficient communication system to, e.g., support wireless devices such as, but not limited to, Massive Machine Type Communication (M-MTC) devices are disclosed. In some embodiments, a base station in a cellular communications network comprises, during initial attachment of a wireless device, establishing a Data Radio Bearer (DRB) between the base station and the wireless device, updating a context of the wireless device to include information regarding the DRB established between the base station and the wireless device to thereby provide a mapping between the DRB and a cellular network identifier of the wireless device. The method further comprises, during initial attachment of the wireless device, providing, to the wireless device, at least a portion of an Internet Protocol (IP) address assigned to the wireless device and updating the context of the wireless device to include the at least a portion of the IP address of the wireless device to thereby provide a mapping between the at least a portion of the IP address of the wireless device and the cellular network identifier of the wireless device. In this manner, simplified wireless connectivity is provided for the wireless device that mitigates the amount of overhead needed for initial attachment.

In some embodiments, the method further comprises maintaining the context of the wireless device even when the wireless device is in idle mode.

In some embodiments, the IP address of the wireless device is an IP version 6 (IPv6) address. Further, in some embodiments, the at least a portion of the IP address of the wireless device is a prefix of the IPv6 address of the wireless device.

In some embodiments, the method further comprises, during the initial attach, receiving, from the wireless device, a router solicitation message. Further, in some embodiments, providing the at least a portion of the IP address to the wireless device comprises transmitting, to the wireless device, a router advertisement comprising the prefix of the IPv6 address of the wireless device in response to receiving the router solicitation message.

In some embodiments, the method further comprises, after the initial attach is complete, receiving an IP packet from an application server, determining that the IP packet is addressed to the wireless device based on the IP address comprised in the IP packet and the at least a portion of the IP address of the wireless device comprised in the context of the wireless device, and transmitting the IP packet to the wireless device on the DRB established for the wireless device.

In some embodiments, the initial attach does not include an Evolved Packet System (EPS) Session Management (ESM) procedure.

In some embodiments, establishing the DRB comprises performing a DRB setup procedure without EPS session establishment. Further, in some embodiments, the method further comprises during the initial attach procedure prior to establishing the DRB between the base station and the wireless device, receiving a Radio Resource Control (RRC) connection request from the wireless device. The method further comprises, upon receiving the RRC connection request, sending an RRC connection setup message to the wireless device. The method further comprises receiving an RRC connection setup complete message and Non-Access Stratum (NAS) attach request from the wireless device, wherein the NAS attach request does not include a Packet Data Network (PDN) connectivity request for ESM.

Still further, in some embodiments, the method further comprises, during the initial attach procedure prior to establishing the DRB between the base station and the wireless device, selecting a Simplified Connectivity Management Server (SCMS) for the wireless device, where the SCMS supports Simplified Wireless Connectivity (SWC). The method further comprises sending, to the SCMS, an initial wireless device message to thereby establish a signaling connection between the base station and the SCMS and an ECM connection between the wireless device and the SCMS, performing authentication and security activation procedures, performing a location update procedure, and receiving, from the SCMS, an initial context setup request. The method further comprises, upon receiving the initial context setup request, creating the context for the wireless device.

In some embodiments, the method further comprises receiving, from an application server, an IP packet for the wireless device, e.g., while the wireless device is idle or suspended. The method further comprises transmitting a paging message for the wireless device using the cellular network identifier of the wireless device, wherein transmitting the paging message is initiated by the base station upon receiving the IP packet for the wireless device.

In some embodiments, the method further comprises starting a timer upon transmitting the paging message. In some embodiments, the method further comprises stopping the timer upon receiving a response from the wireless device. In some other embodiments, the method further comprises stopping the timer upon receiving a RRC connection setup complete message or an RRC connection resume message from the wireless device.

In some embodiments, the method further comprises, upon expiry of the timer without receiving a response to the paging message from the wireless device, sending a message comprising a cellular network identifier of the wireless device to a SCMS.

In some embodiments, the method further comprises upon expiry of the timer without receiving a response to the paging message from the wireless device, sending a message comprising a cellular network identifier of the wireless device to a SCMS such that the SCMS initiates paging of the wireless device by a plurality of base stations in one or more tracking areas in a tracking area list of the wireless device.

In some embodiments, receiving the IP packet for the wireless device comprises receiving the IP packet and mapping an IP address of the IP packet to a network identifier of the wireless device based on a stored mapping between at least a portion of an IP address of the wireless device and the network identifier of the wireless device. Further, in some embodiments, the IP address of the wireless device is an IPv6 address, and the at least a portion of the IP address of the wireless device is a prefix of the IPv6 address of the wireless device.

Embodiments of a base station for a cellular communications network are also disclosed. In some embodiments, the base station comprises at least one radio unit, a network interface, at least one processor, and memory comprising instructions executable by the at least one processor whereby the base station implements a function having IP node and router functionality that is operable to, during initial attachment of a wireless device, establish a DRB between the base station and the wireless device, update a context of the wireless device to include information regarding the DRB established between the base station and the wireless device to thereby provide a mapping between the DRB and a cellular network identifier of the wireless device. During initial attachment, the function is further operable to provide, to the wireless device, at least a portion of an IP address assigned to the wireless device and update the context of the wireless device to include the at least a portion of the IP address of the wireless device to thereby provide a mapping between the at least a portion of the IP address of the wireless device and the cellular network identifier of the wireless device.

In some embodiments, the function is further operable to maintain the context of the wireless device even when the wireless device is in idle mode.

In some embodiments, the IP address of the wireless device is an IPv6 address. Further, in some embodiments, the at least a portion of the IP address of the wireless device is a prefix of the IPv6 address of the wireless device.

In some embodiments, the initial attach procedure does not include an ESM procedure.

In some embodiments, in order to establish the DRB, the function is operable to perform a DRB setup procedure without EPS session establishment.

In some embodiments, the function is further operable to receive, from an application server, an IP packet for the wireless device and transmit a paging message for the wireless device using the cellular network identifier of the wireless device, wherein transmitting the paging message is initiated by the base station upon receiving the IP packet for the wireless device.

In some embodiments, the function is further operable to start a timer upon transmitting the paging message. Further, in some embodiments, the function is further operable to stop the timer upon receiving a response from the wireless device. In some other embodiments, the function is further operable to stop the timer upon receiving a RRC connection setup complete message or an RRC connection resume message from the wireless device.

In some embodiments, the function is further operable to, upon expiry of the timer without receiving a response to the paging message from the wireless device, send a message comprising a cellular network identifier of the wireless device to a SCMS.

In some embodiments, the function is further operable to, upon expiry of the timer without receiving a response to the paging message from the wireless device, send a message comprising a cellular network identifier of the wireless device to a SCMS such that the SCMS initiates paging of the wireless device by a plurality of base stations in one or more tracking areas in a tracking area list of the wireless device.

In some embodiments, in order to receive the IP packet for the wireless device, the function is further operable to receive the IP packet and map an IP address of the IP packet to a network identifier of the wireless device based on a stored mapping between at least a portion of an IP address of the wireless device and the network identifier of the wireless device. Further, in some embodiments, the IP address of the wireless device is an IPv6 address, and the at least a portion of the IP address of the wireless device is a prefix of the IPv6 address of the wireless device.

In some embodiments, a base station for a cellular communications network is provided, wherein the base station is adapted to, during initial attachment of a wireless device, establish a DRB between the base station and the wireless device and update a context of the wireless device to include information regarding the DRB established between the base station and the wireless device to thereby provide a mapping between the DRB and a cellular network identifier of the wireless device. During the initial attachment, the base station is further adapted to provide, to the wireless device, at least a portion of an IP address assigned to the wireless device and update the context of the wireless device to include the at least a portion of the IP address of the wireless device to thereby provide a mapping between the at least a portion of the IP address of the wireless device and the cellular network identifier of the wireless device.

In some embodiments, the base station is further adapted to perform the method of operation of the base station according to any one of the embodiments disclosed herein.

Embodiments of a computer program are also disclosed. In some embodiments, a computer program comprises instructions which, when executed on at least one processor, cause the at least one processor to carry out the method of operation of a base station according to any one of the embodiments disclosed herein. Further, in some embodiments, a carrier containing the aforementioned computer program is provided, wherein the carrier is one of an electronic signal, an optical signal, a radio signal, or a computer readable storage medium.

In some embodiments, a base station for a cellular communications network comprises a plurality of modules operable to perform respective functions during initial attachment of a wireless device. The plurality of modules comprise an establishment module, a first updating module, a providing module, and a second updating module. The establishing module is operable to establish a DRB between the base station and the wireless device. The first updating module is operable to update a context of the wireless device to include information regarding the DRB established between the base station and the wireless device to thereby provide a mapping between the DRB and a cellular network identifier of the wireless device. The providing module is operable to provide, to the wireless device, at least a portion of an IP address assigned to the wireless device. The second updating module is operable to update the context of the wireless device to include the at least a portion of the IP address of the wireless device to thereby provide a mapping between the at least a portion of the IP address of the wireless device and the cellular network identifier of the wireless device.

Embodiments of a method of operation of a network node in a core network of a cellular communications network are also disclosed. In some embodiments, a method of operation of a network node in a core network of a cellular communications network comprises, during an initial attachment procedure by which a wireless device is attached to a base station, obtaining SWC support information of the wireless device and sending an instruction to the base station to provide SWC to the wireless device based on the SWC support information of the wireless device. In some embodiments, the method further comprises refraining from performing ESM during the initial attachment procedure by which the wireless device is attached to the base station.

In some embodiments, the method further comprises, during a paging procedure by which the wireless device is paged, receiving a message comprising a cellular network identifier of the wireless device from the base station upon unsuccessful paging of the wireless device by the base station. The method further comprises, upon receiving the message, triggering paging of the wireless device by a plurality of base stations in one or more tracking areas in a tracking area list of the wireless device. Further, in some embodiments, the method further comprises, upon receiving the message and triggering paging of the wireless device by the plurality of base stations, starting a timer and stopping the timer upon receiving a message from one of the plurality of base stations that indicates that paging of the wireless device by that base station was successful.

Embodiments of a network node for a core network of a cellular communications network are also disclosed. In some embodiments, a network node for a core network of a cellular communications network comprises a network interface, one or more processors, and memory containing software executable by the one or more processors whereby the network node is operable to, during an initial attachment procedure by which a wireless device is attached to a base station, obtain SWC support information of the wireless device and send, to the base station, an instruction to the base station to provide SWC to the wireless device based on the SWC support information of the wireless device. In some embodiments, the network node is further operable to refrain from performing ESM during the initial attachment procedure by which the wireless device is attached to the base station.

In some embodiments, the network node is further operable to, during a paging procedure by which the wireless device is paged, receive a message comprising the cellular network identifier of the wireless device from the base station upon unsuccessful paging of the wireless device by the base station. The network node is further operable to, upon receiving the message, trigger paging of the wireless device by a plurality of base stations in one or more tracking areas in a tracking area list of the wireless device.

In some embodiments, a network node for a core network of a cellular communications network is adapted to, during an initial attachment procedure by which a wireless device is attached to a base station, obtain SWC support information of the wireless device and send an instruction to the base station to provide SWC to the wireless device based on the SWC support information of the wireless device.

In some embodiments, the network node is further adapted to perform the method of operation of any one of the embodiments of the network node disclosed herein.

Embodiments of a computer program are also disclosed. In some embodiments, a computer program comprises instructions which, when executed on at least one processor, cause the at least one processor to carry out the method of operation of a network node according to any one of the embodiments disclosed herein. Further, in some embodiments, a carrier containing the aforementioned computer program is provided, wherein the carrier is one of an electronic signal, an optical signal, a radio signal, or a computer readable storage medium.

In some embodiments, a network node for a cellular communications network comprises a plurality of modules operable to perform functions during an initial attachment procedure by which a wireless device is attached to a base station. The plurality of modules comprises an obtaining module and a sending module. The obtaining module is operable to obtain SWC support information of the wireless device. The sending module is operable to send an instruction to the base station to provide SWC to the wireless device based on the SWC support information of the wireless device.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 2 illustrates an end-to-end path from the User Equipment device (UE) to a Peer Entity via the Simplified Connectivity Function (SCF);

DETAILED DESCRIPTION

Figure 1:
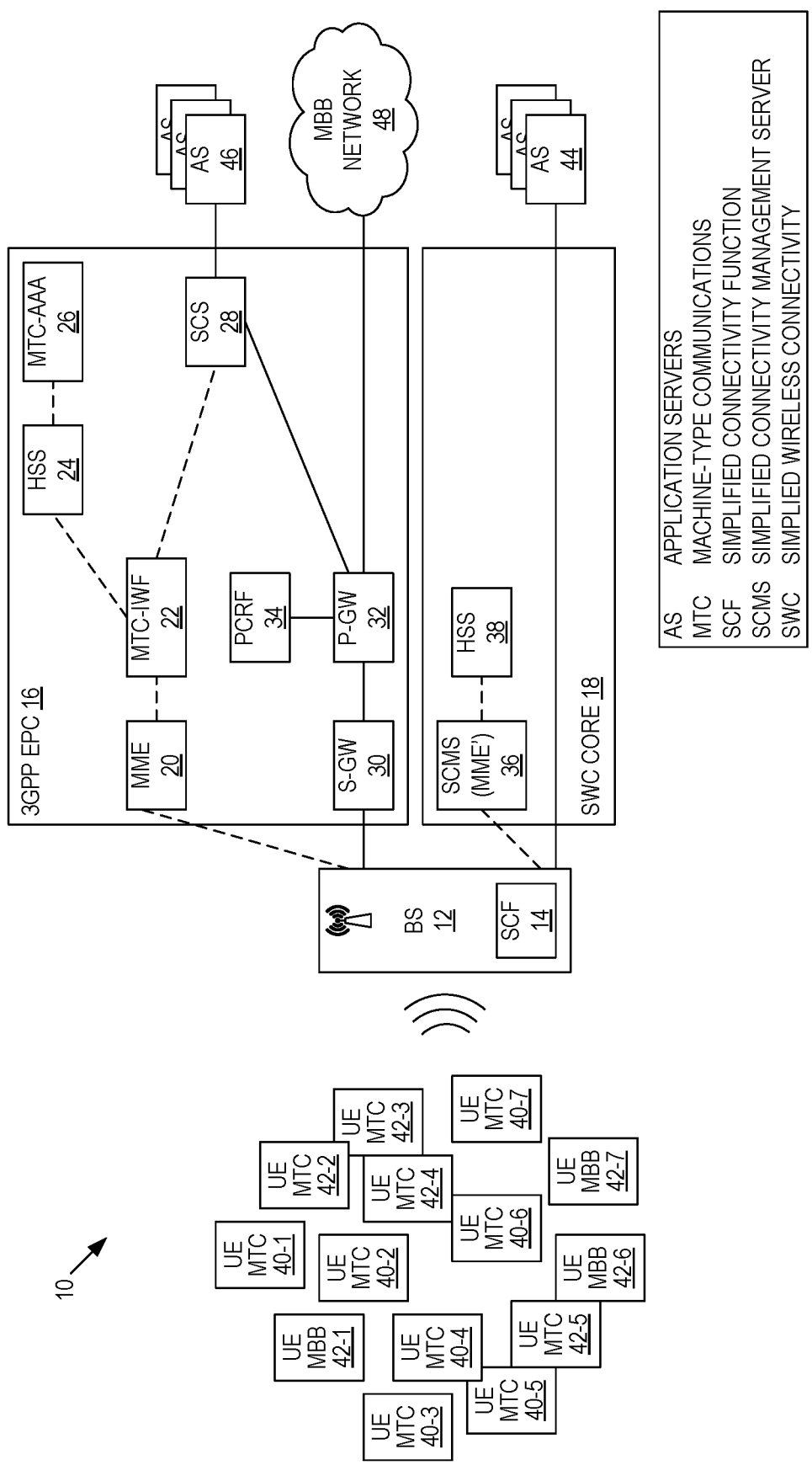
FIG. 1 illustrates an overview of the architecture and the main functional entities of the present disclosure.
Figure 3A:
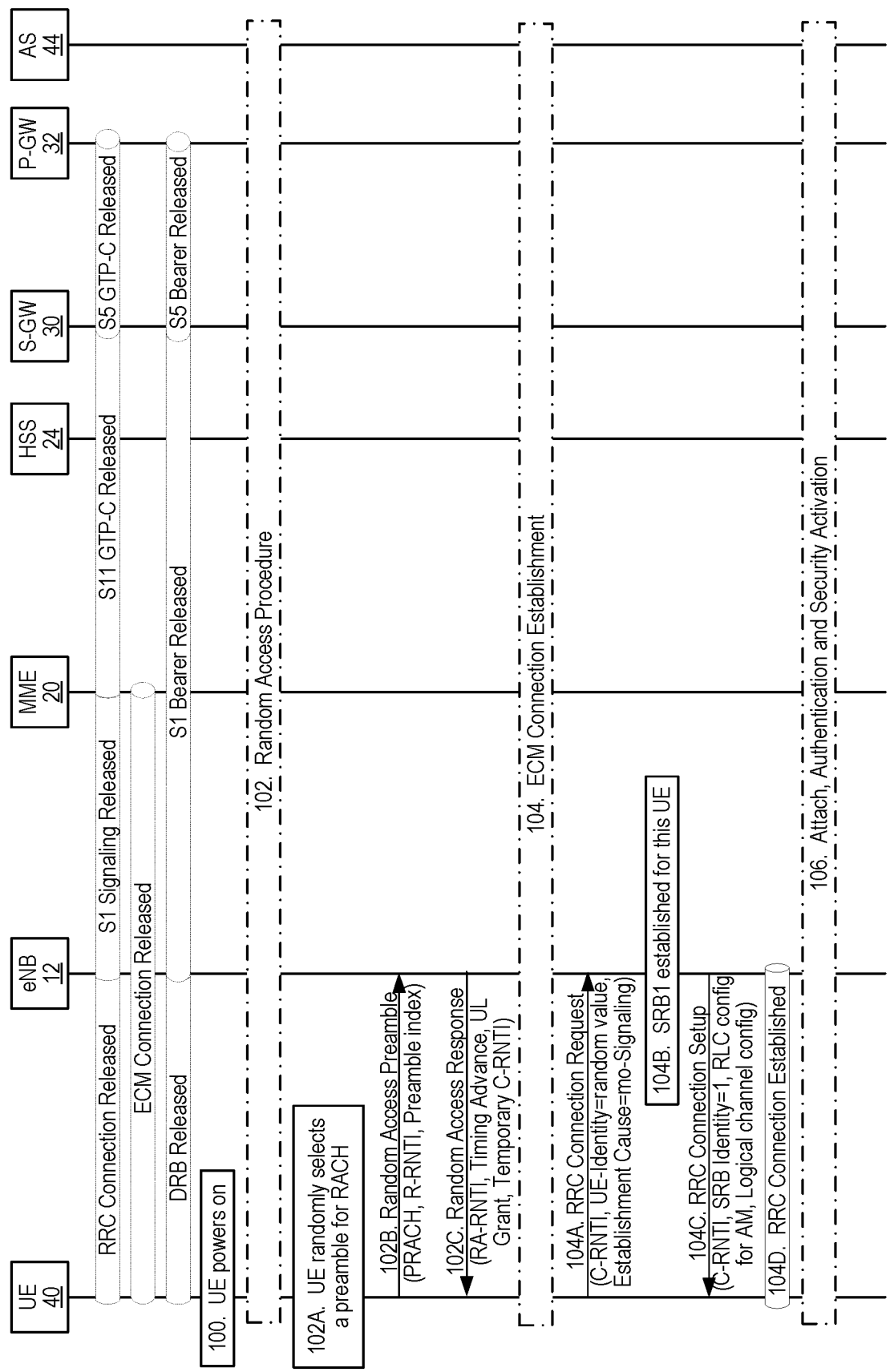
FIGS. 3A through 3F illustrate a conventional initial attachment procedure as specified in Third Generation Partnership (3GPP) Long Term Evolution (LTE) standards.
Figure 3B:
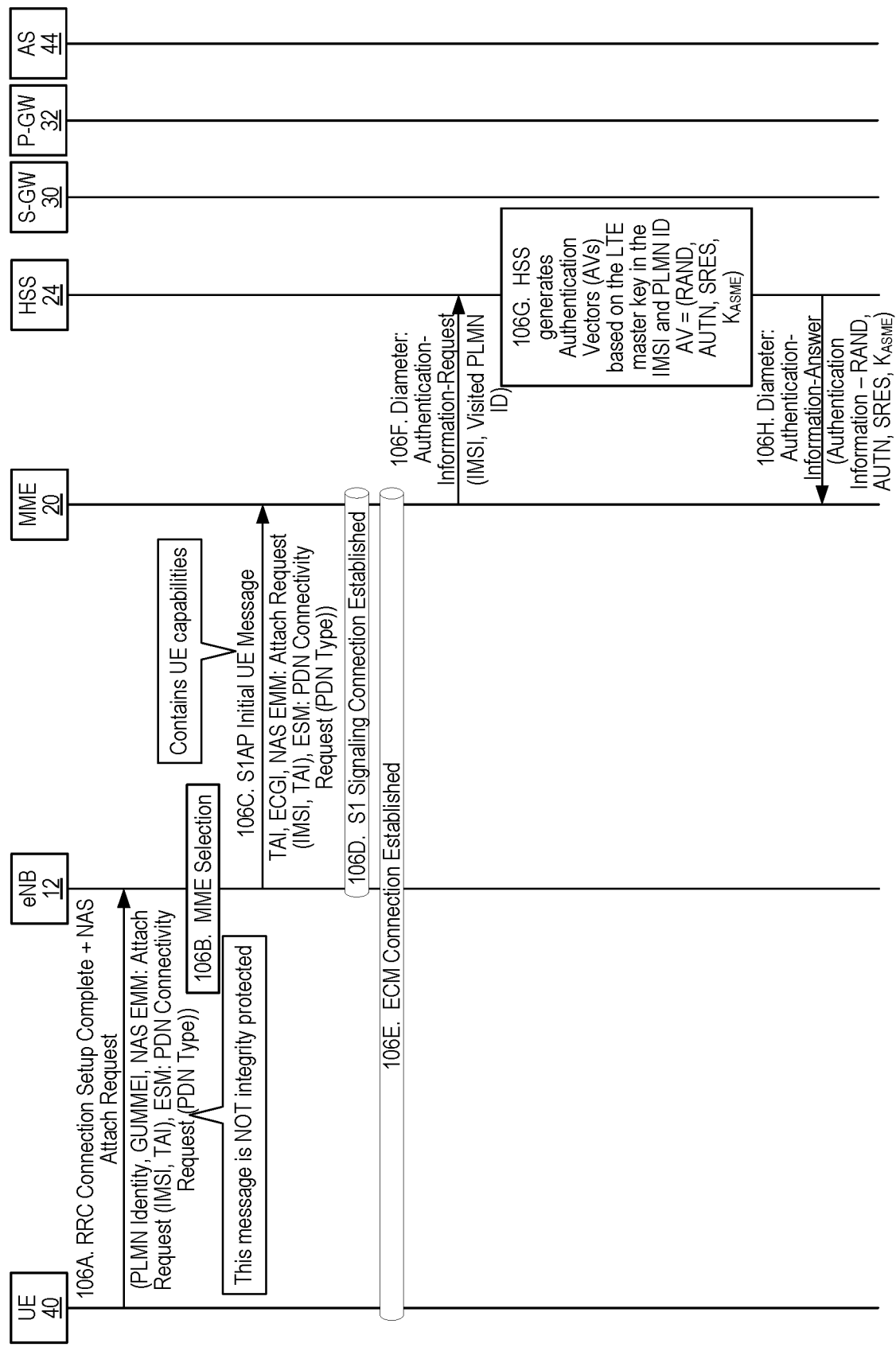
Figure 3C:
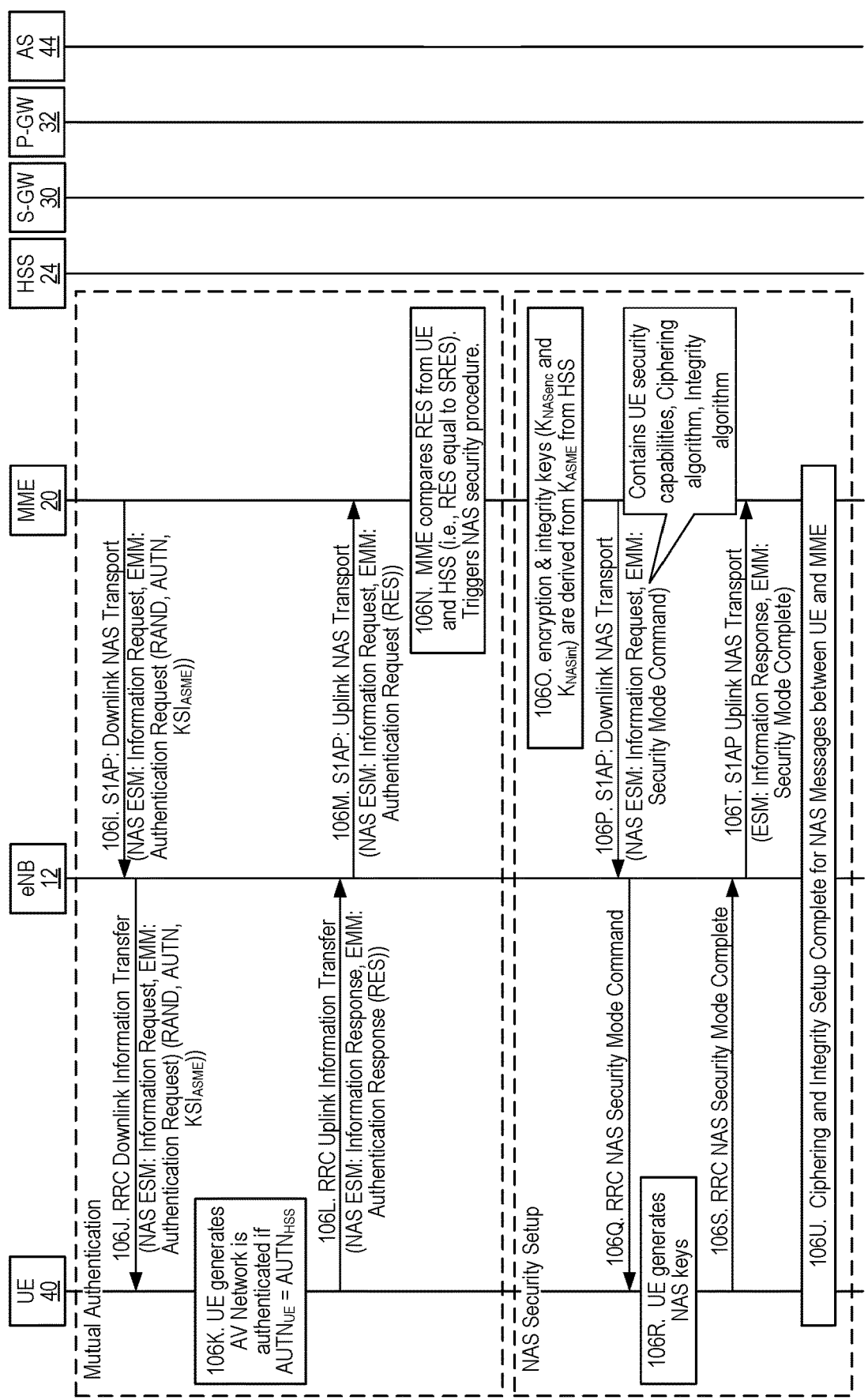
Figure 3D:
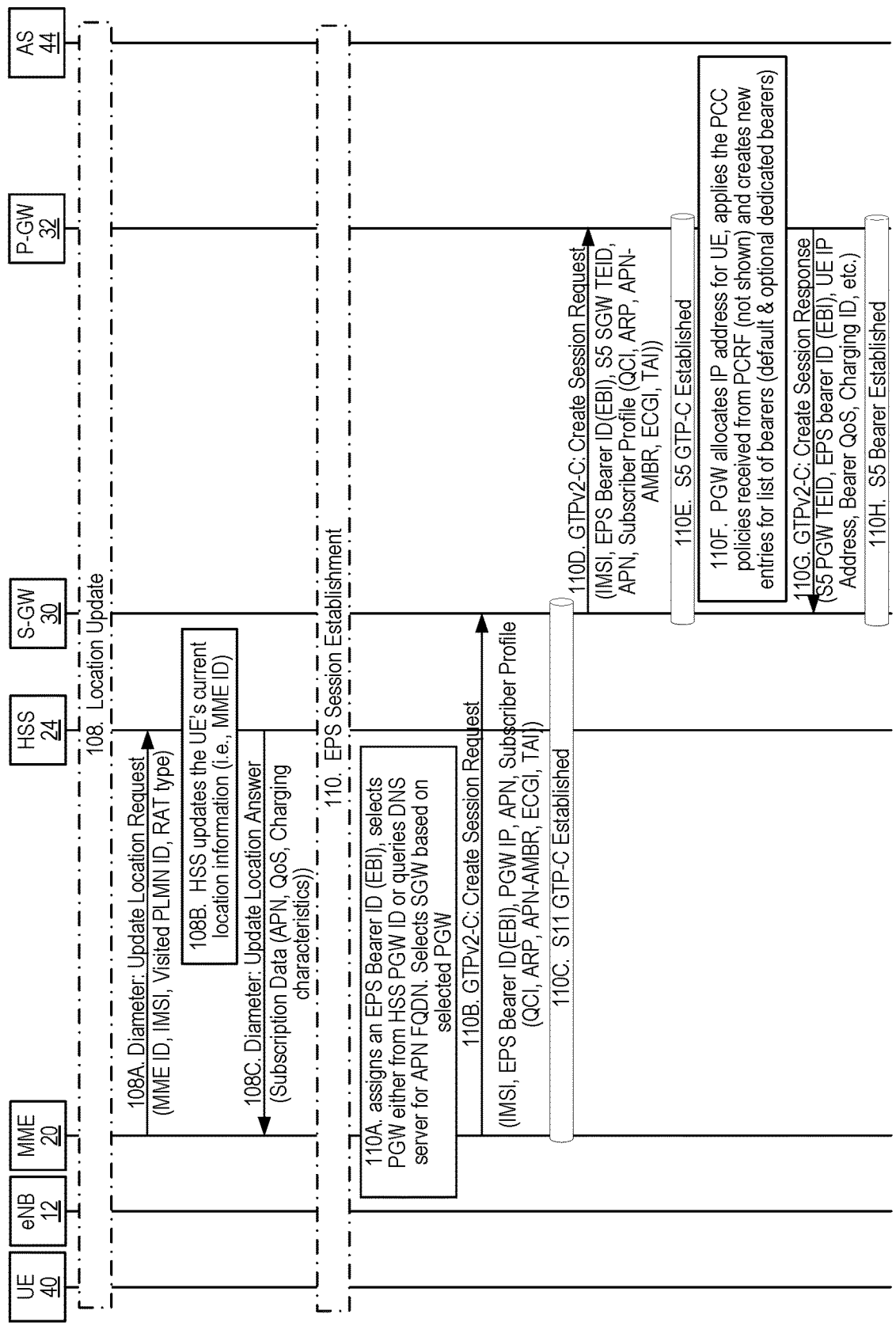
Figure 3E:
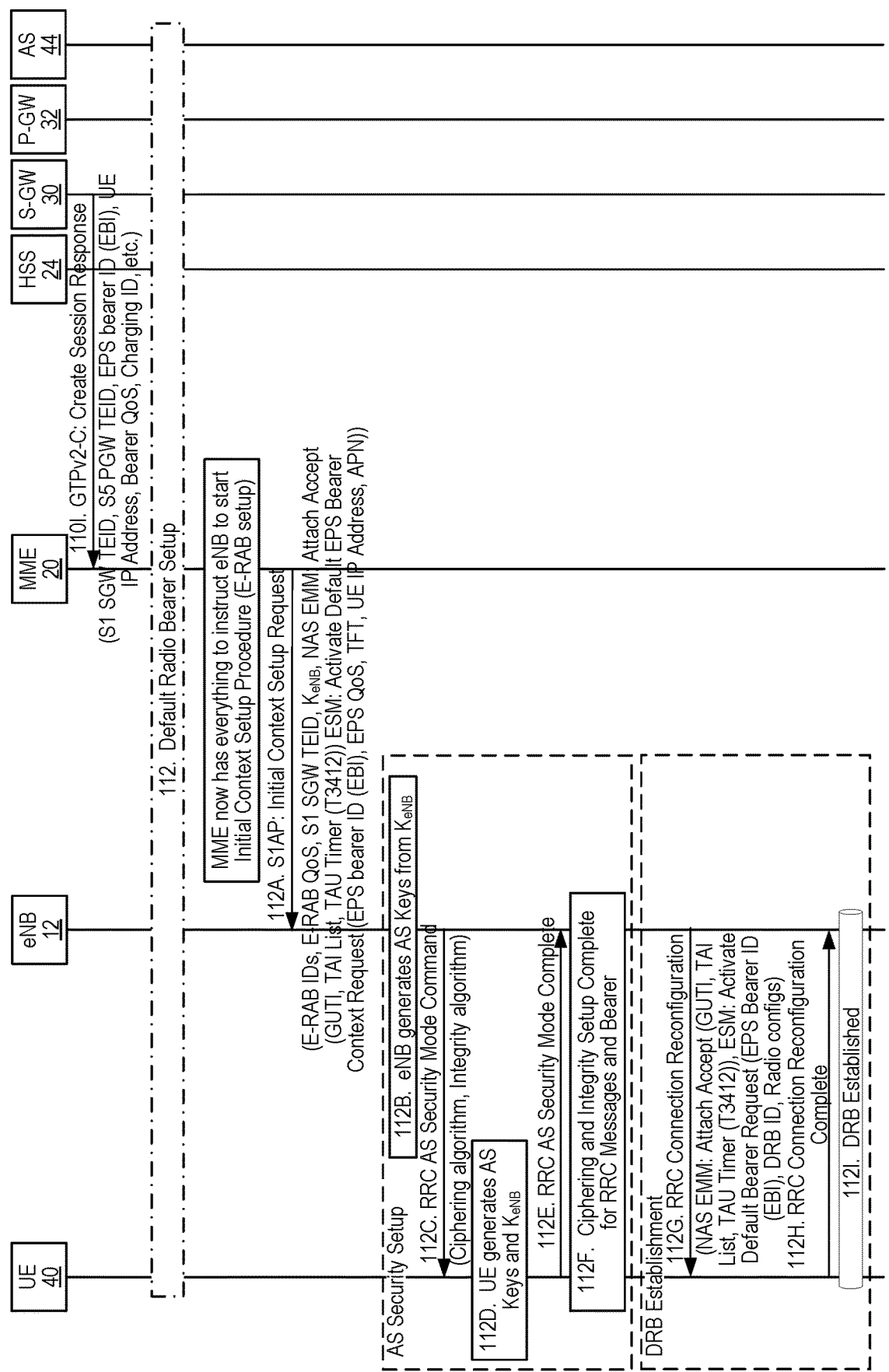
Figure 3F:
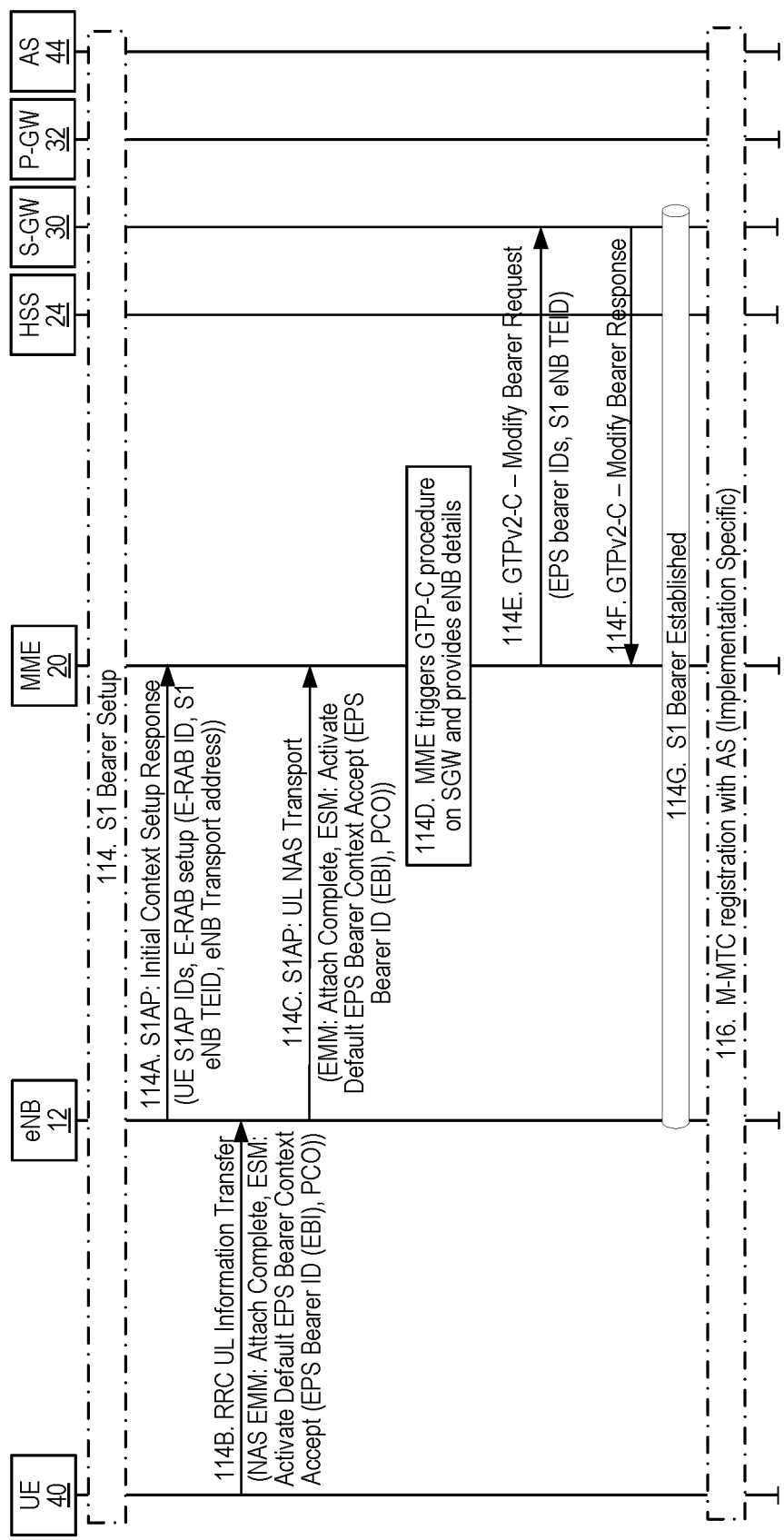
Figure 4A:
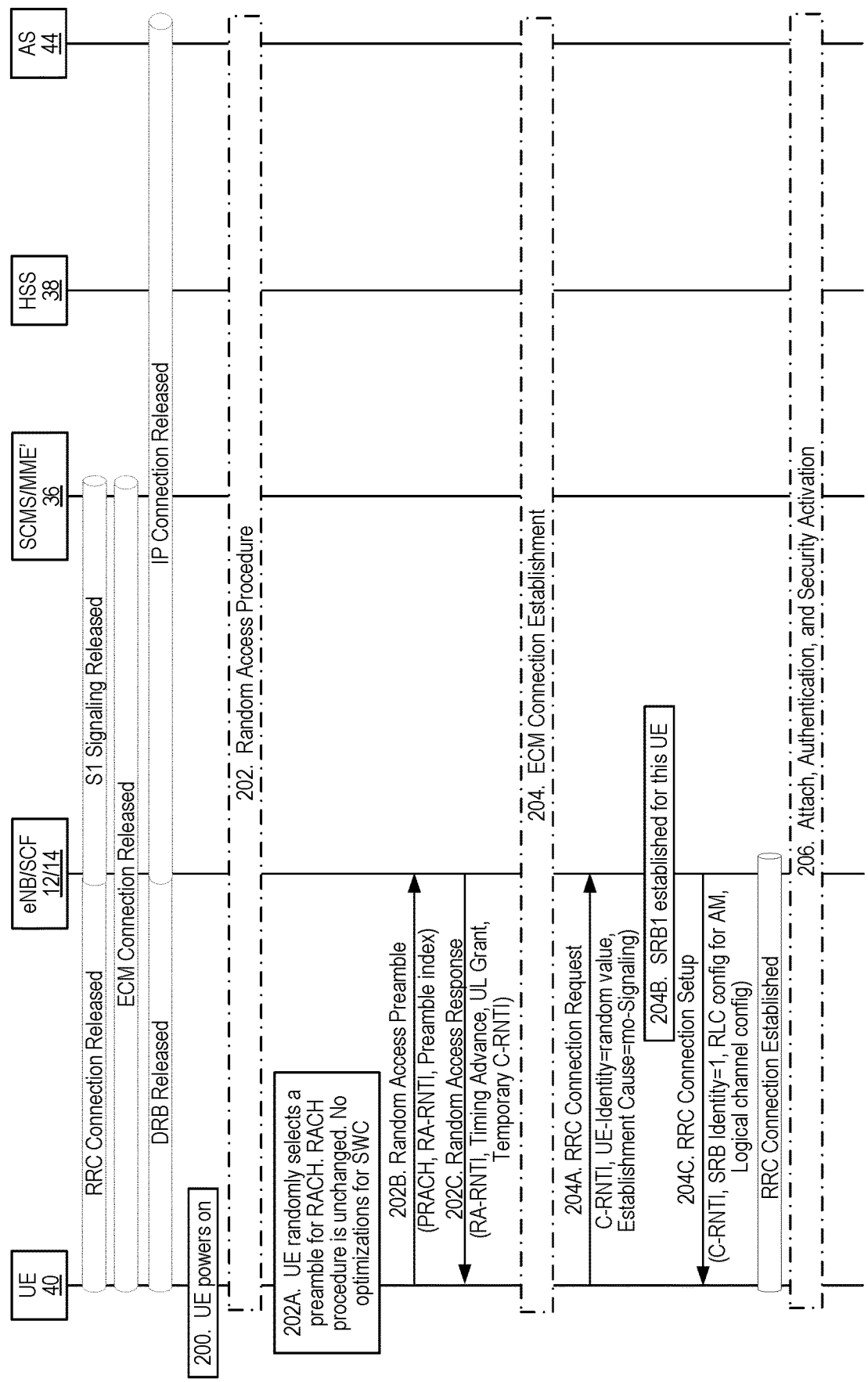
FIGS. 4A through 4F illustrate a Simplified Wireless Connectivity (SWC) initial attachment procedure according to some embodiments of the present disclosure.
Figure 4B:
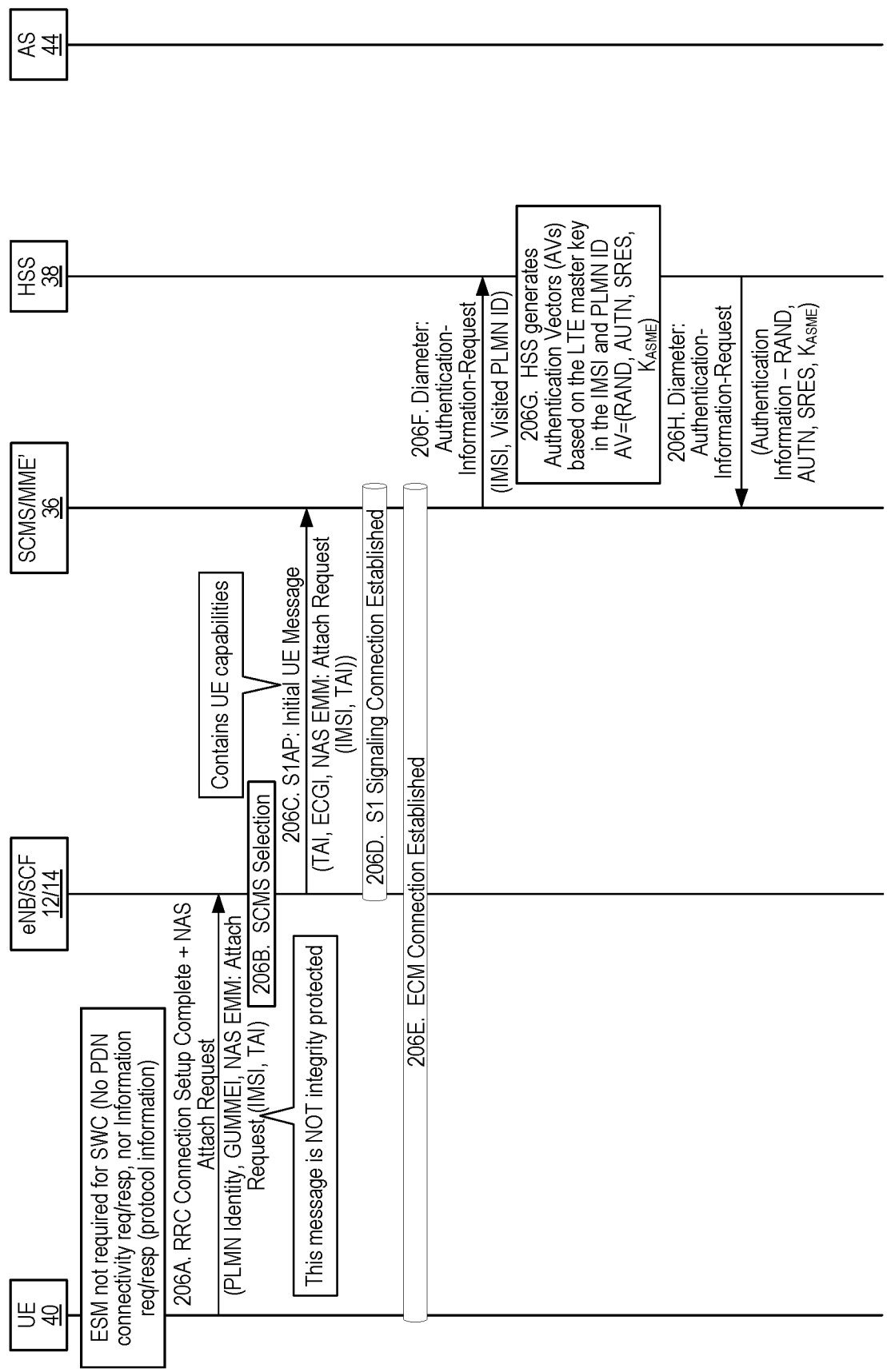
Figure 4C:
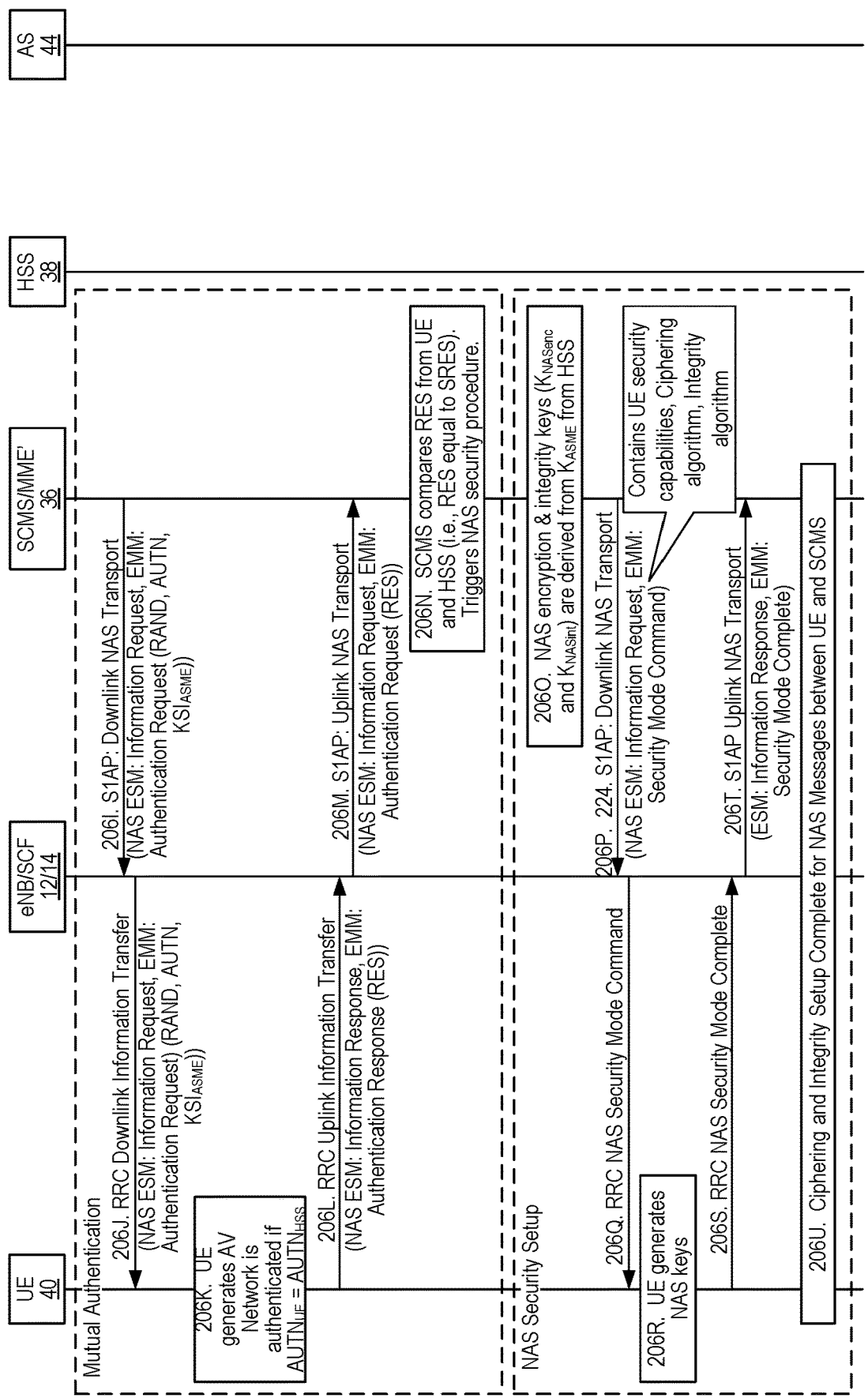
Figure 4D:
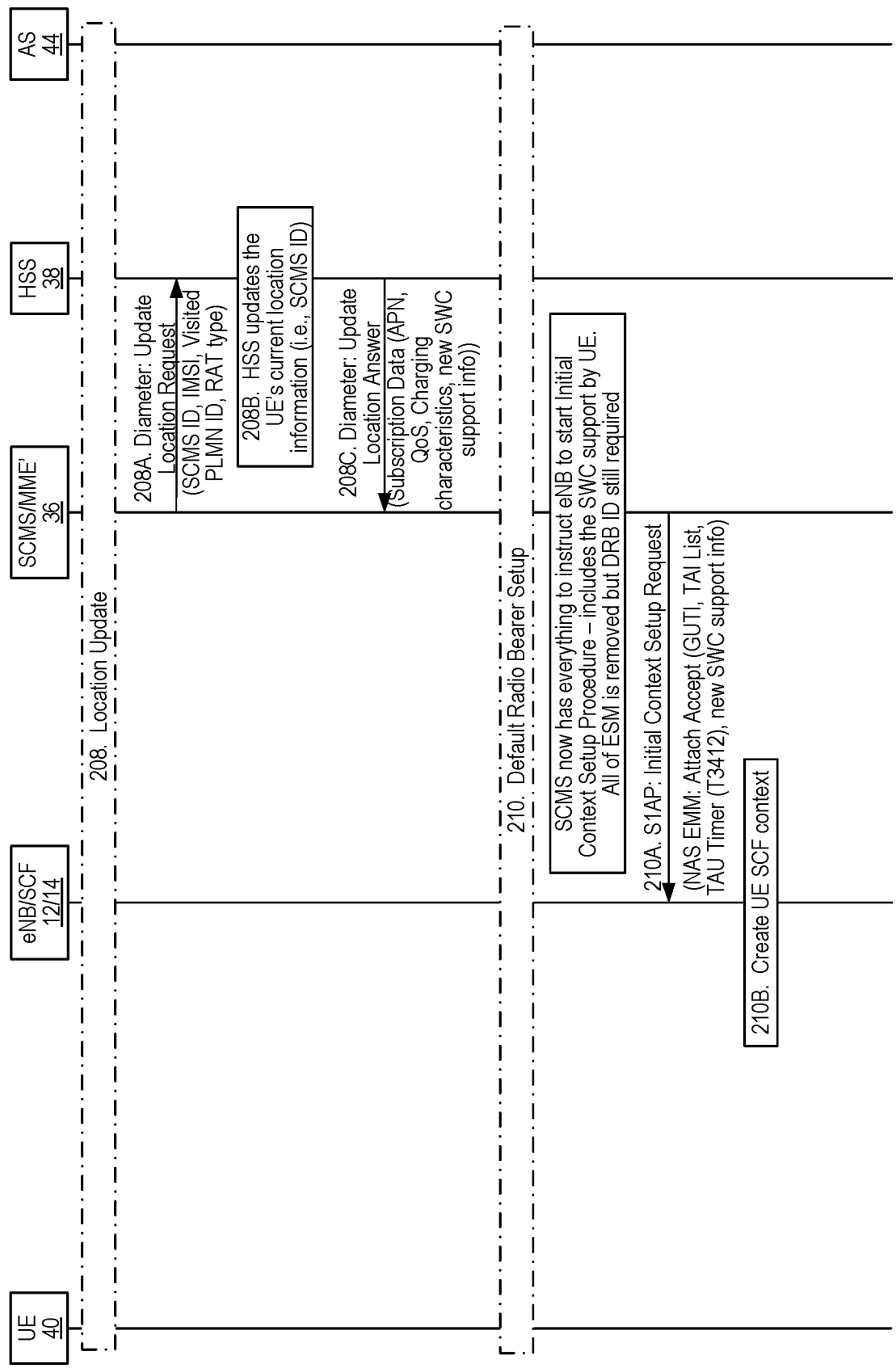
Figure 4E:
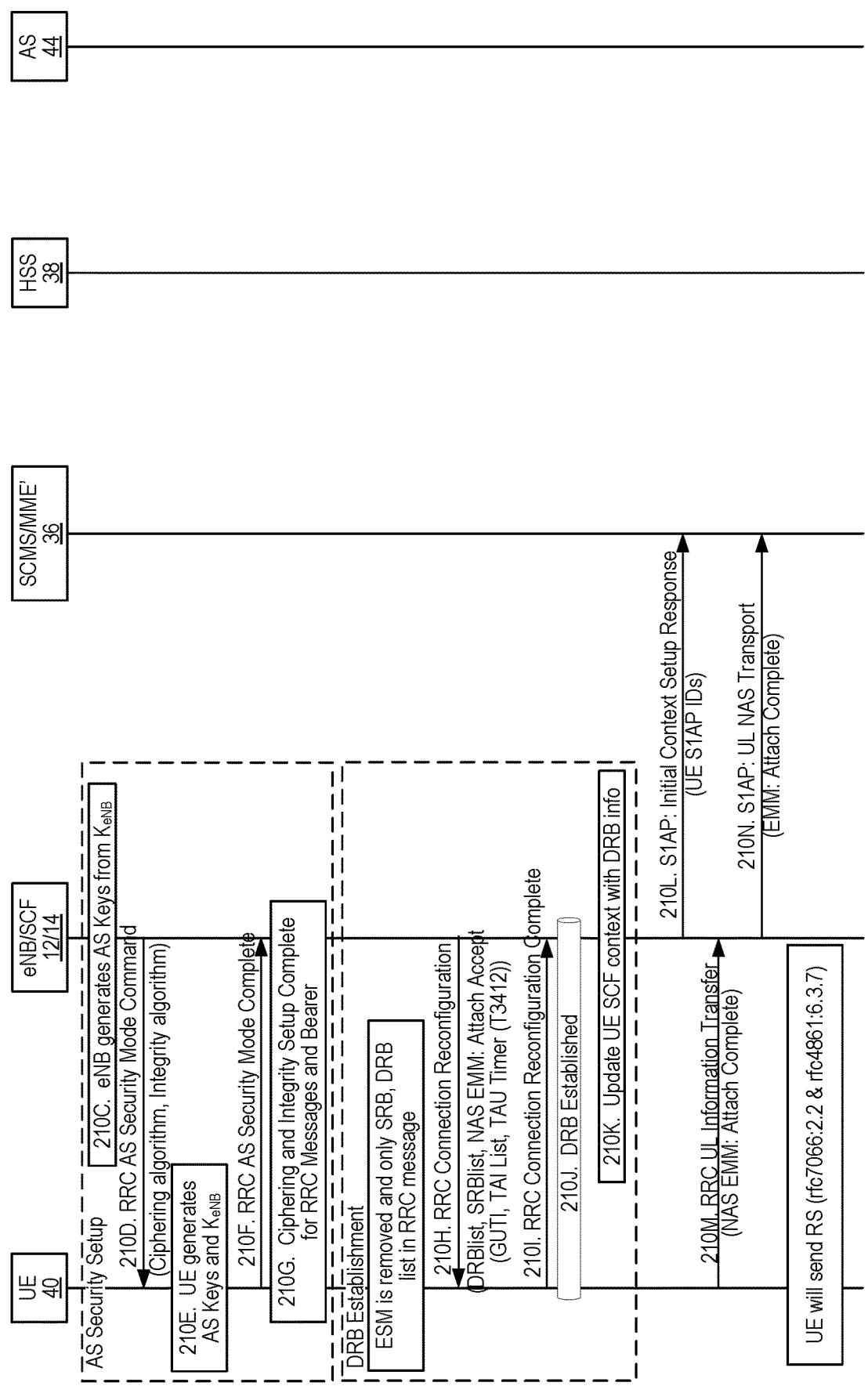
Figure 4F:
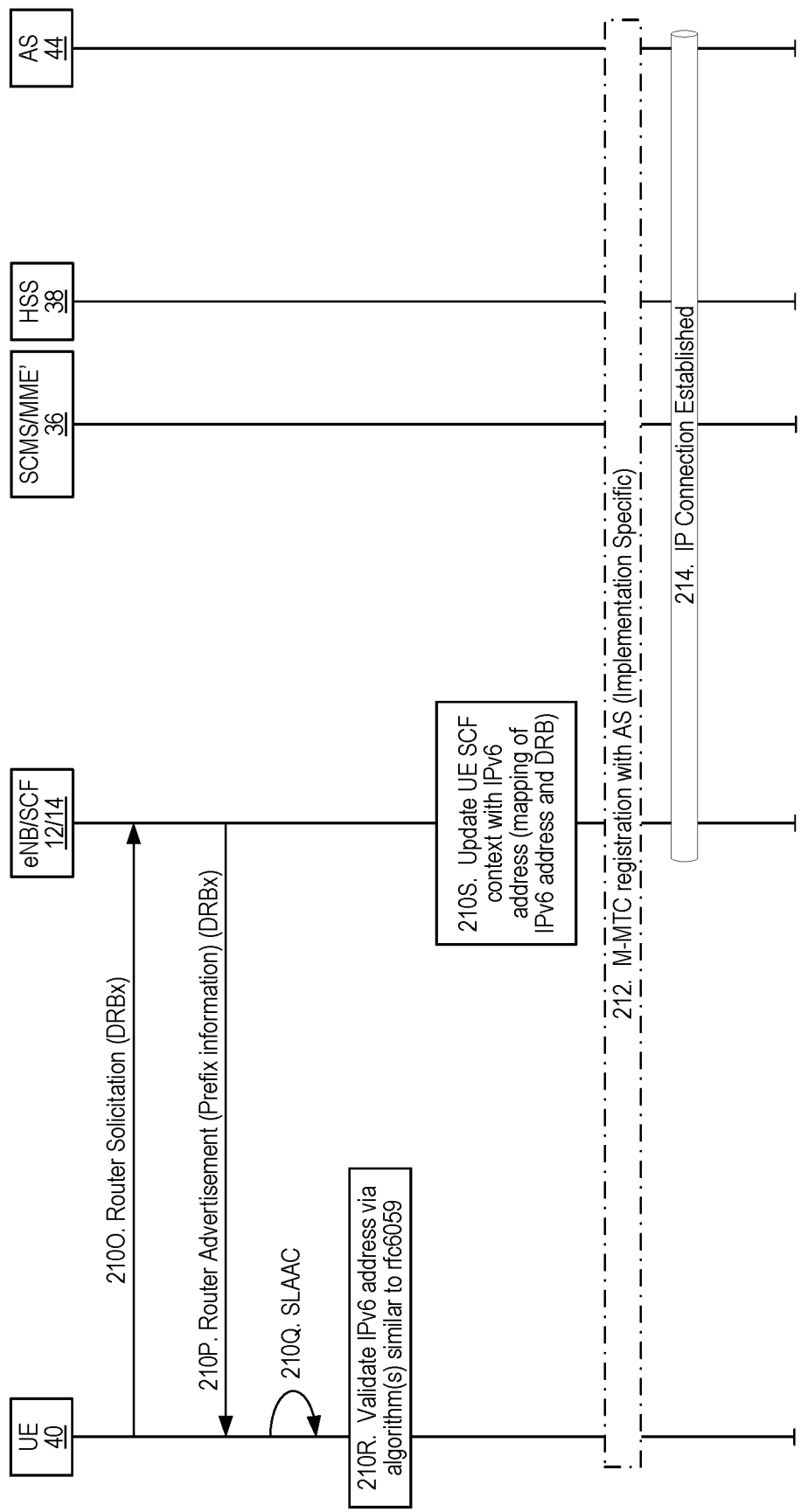

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Importantly, it should be noted that while Third Generation Partnership Project (3GPP) Long Term Evolution (LTE) terminology such as, e.g., User Equipment device (UE) and enhanced Node B (eNB) are used for much of the description provided herein, the use of this terminology is not intended to limit the scope of the present disclosure to 3GPP LTE. For instance, while the term eNB is used herein, it should be appreciated that the functionality of the eNB described herein may more generally be implemented in a base station or, even more generally, a radio access node (i.e., a network node in a Radio Access Network (RAN) of a cellular communications network). Likewise, while the terms UE, Machine Type Communication (MTC) device, and Massive MTC (M-MTC) device are used herein, it should be understood that the functionality of the UE, MTC, or M-MTC described herein may more generally be implemented on any type of wireless device.

Ubiquity of applications supporting the networked society demands an efficient communication system to support MTC devices. MTC devices and applications operate with a different pattern of communication that imposes excessive signaling loads that cannot be easily handled by the existing architectures. The present disclosure proposes a simplified approach to wireless connectivity to cope with the requirements of M-MTC devices. Importantly, while embodiments of the present disclosure focus on MTC devices and M-MTC devices, the embodiments described herein are equally applicable to wireless devices (e.g., UEs) in general and are not limited to MTC and M-MTC devices. The essence of the present disclosure is based on an optimized and simplified Internet Protocol (IP) version 6 (IPv6) connectivity at the existing base stations for a large number of MTC devices while supporting the coexistence of legacy mobile devices. The focus of the present disclosure is on the core network aspect of the end-to-end connectivity.

Various reports forecast a large number of mobile devices to be connected by 2020 and beyond (see [1]). The market expansion of the Internet of Things (IoT) and MTC (see [12] and [1]) calls for rapid evolution of radio access and core networks. Design requirements are already in place to ensure that future mobile applications and devices are certified and are able to fulfill the operator's requirements (see [13]). A substantial number of MTC devices are also expected to generate lower average revenue per user. As a result, the operators may establish a set of policies and requirements for resources that are dimensioned for low revenue use cases (see [2]). Therefore, sustaining the traffic growth from large sets of diverse mobile devices and communication patterns remains a challenge which will be referred to in the present disclosure as the 26 Billion (26B) challenge.

The 3GPP has listed the network requirements for a generic MTC deployment and proposes an enhanced Evolved Packet Core (EPC) solution to meet them, i.e., with MTC-dedicated EPC functionalities (see [4] and [5]). It has already been shown in [11] that the 3GPP proposed architecture could be further enhanced. However, the proposed solution varies significantly from the 3GPP based approach because analysis indicates that the EPC signaling load and the user plane overhead remain high. The already existing proposals have the following disadvantages:

Data plane management overhead: an excessive number of M-MTC devices and frequent establishment and modifications of Data Radio Bearers (DRBs) impose a significant load on the control plane signaling. A significant portion of the signaling overhead imposed to the Mobility Management Entity (MME) is due to establishment and reconfiguration of General Packet Radio Service (GPRS) Tunneling Protocol (GTP) tunnels between a Serving Gateway (S-GW) and a Packet Data Network (PDN) Gateway (P-GW).

Global and static inactivity timers at the base station make the network management agnostic from type of traffic as envisioned by different M-MTC device profiles. This is in part due to the fact that DRBs are not aware of the M-MTC profile and context as well as the type of traffic.

In the present disclosure a Simplified Wireless Connectivity (SWC) approach is proposed to address the 26B challenge for communication of MTC devices particularly for the case of M-MTC for future Fifth Generation (5G) networks. The emphasis of this work is expand on the core network functionality with the following objectives:

Efficient and scalable: the traffic should benefit from efficient IP connectivity that is optimized for MTC communication patterns, which could include infrequent and small volumes of data. Also, the signaling should be rationalized to provide better scalability.

Optimal and simple: the utilization of the network should be improved and payload data traffic should be maximized. Also, a simplified network provides better manageability.

As used herein, SWC is defined as a connectivity scheme in which an end-to-end connection between the UE and a peer entity (e.g., an Application Server (AS)) consists of a radio bearer established between the UE and a base station (e.g., an eNB or gNB, where gNB refers to a base station in 5G NR) and an IP connection between the base station and the peer entity, where the base station provides IP routing and IP connectivity between the UE and the peer entity.

The cornerstone of the present disclosure is simplified IP-based connectivity through the base station with dual personality to support the coexistence of legacy mobile devices as well as M-MTC devices. As used herein, a base station with "dual personality" is a base station that supports coexistence of legacy mobile devices as well as M-MTC devices. As a consequence, some legacy core functionalities are still required for SWC, such as those for security mechanisms that have proven to be successful in 3GPP Evolved Packet Systems (EPSs). Furthermore, SWC should be easily extensible by software to provide enhanced network functions and meet new requirements such as those for M-MTC. To incrementally support such basic connectivity, SWC should be equipped with functions that improve network utilization. Given the large number of devices that need to be connected, IPv6 is the protocol of choice for such deployments. The contribution of the present disclosure is twofold: (1) a flexible architecture is proposed that enables an efficient core connectivity to meet M-MTC requirements in the 26B context. Given its modular approach, SWC allows easy integration of legacy operator services. (2) Through leveraging IPv6 based mechanisms, re-using the principle of separating the user and control planes, and revising some control plane schemes, the present disclosure leads to a simplification of the control plane and the data plane for the different MTC scenarios.

The remainder of the present disclosure is structured as follows. The Proposed Solution section presents an outline of the details of the proposed architecture and its functional entities. The Architecture Model section expands further on the functional elements of the proposed architecture.

In this section, the present disclosure delves into the SWC general architecture model and shows how the SWC design satisfies the objective of providing optimized connectivity to M-MTC devices. Importantly, while embodiments of the present disclosure focus on MTC devices and M-MTC devices, the embodiments described herein are equally applicable to wireless devices (e.g., UEs) in general and are not limited to MTC and M-MTC devices. In the proposed SWC solution, co-existence with legacy RANs and EPCs are ensured. The proposed SWC architecture also leverages IPv6 mechanisms and intrinsically enables local breakout (i.e., the base station routes the traffic to and from the M-MTC devices bypassing the core network infrastructure). For the SWC architecture, the issues prevalent to M-MTC are primarily addressed, which include devices such as, e.g.:

Smart Wearables: Measure pressure, temperature, heart rate, blood pressure, body temperature, breathing rate, and volume, skin moisture, etc.

Sensor Networks: Metering (e.g., gas, energy, and water), city or building lights management, environment (e.g., pollution, temperature, humidity, noise) monitoring, and vehicle traffic control represent prominent examples of services in a smart city.

Mobile Video Surveillance: May evolve to be available on aircrafts, drones, cars, and safety and security personnel for monitoring.

Asset tracking solutions and telemetry.

Embodiments of the present disclosure provide efficient, scalable, and simplified core connectivity for a better network utilization through alleviation of user plane signaling overhead. In addition, the proposed SWC includes backward compatibility to support legacy devices. In order to meet these goals, the proposed SWC assumes the following:

5G/LTE and IPv6 are supported by the M-MTC devices.

An M-MTC device hosts only MTC applications which benefit from the connectivity proposal. IPv6 multiaddressing could be used, for instance, to bind different MTC applications to separate IPv6 Global Unicast Addresses (GUAs).

By relaxing the requirements for mobility, a simplified approach towards an optimized triggering procedure is envisioned that is suitable for the case of an MTC device (nomadicity as opposed to mobility). The reason for this approach is that although MTC devices may be mobile, session continuity may not be necessary which implies that no X2 or S1 handover, as described in 3GPP Technical Specification (TS) 23.401, is necessary. In addition, nomadicity does not require that the packet data connection context (e.g., EPS context) be preserved. Note that, as used herein, a packet data connection context is a block of information in an eNB containing the necessary information required to maintain the E-UTRAN services towards the connected wireless device. Upon attaching to a new eNB, a new IPv6 session will be established and follows the enhanced reattachment procedure through a Simplified Connectivity Function (SCF) at the eNB.

FIG. 1 shows an overview of the architecture and the main functional entities of the present disclosure. As illustrated in FIG. 1, a wireless communication system 10 includes a RAN that includes one or more radio access nodes such as a base station 12. The base station 12 may be, for example, an eNB or gNB (i.e., a base station in a 5G New Radio (NR) network). As discussed below in detail, the base station 12 includes a SCF 14. The SCF 14 may be implemented in software or a combination of hardware and software, depending on the particular implementation. In this example, the base station 12 is connected to a conventional 3GPP EPC 16 as well a new SWC core 18, which is described in detail below. As will be appreciated by one of ordinary skill in the art, the 3GPP EPC 16 includes various core network nodes such as a MME 20, a MTC Interworking Function (MTC-IWF) 22, a Home Subscriber Server (HSS) 24, a MTC Authentication, Authorization, and Accounting function (MTC-AAA) 26, a Service Capability Server (SCS) 28, a S-GW 30, a P-GW 32, and a Policy, Charging, and Rules Function (PCRF) 34. The functionality of the 3GPP EPC 16 is well-known in the art and, as such, the details are not repeated herein. As described below in detail, the SWC core 18 includes a Simplified Connectivity Management Server (SCMS) 36, which is also referred to herein as a MME', and a HSS 38. Note that the SCMS 36 is a term used for the description provided herein; however, the actual name given to this node may vary depending on the particular implementation. Thus, for generality, the SCMS 36 may alternatively be referred to as a core network node or function implemented on a core network node.

The base station 12 provides wireless, or radio, access to a number of wireless devices, which are referred to herein as UEs 40 and 42. The UEs 40 and 42 may be of various types including, but not limited to, MTC devices and Mobile Broadband (MBB) devices. In this example, the UEs 40, which are individually referred to as UEs 40-1 through 40-7, are MTC devices that support SWC and that utilize SWC for, e.g., initial attachment and establishment of IP connectivity to Application Servers (ASs) 44 as well as paging, as described below. Conversely, that UEs 42 are devices (e.g., MTC or MBB devices) that do not support SWC or for any reason do not utilize SWC for, e.g., initial attachment and connectivity to ASs 46 and/or a MBB network 46 and paging (i.e., use legacy 3GPP techniques for initial attachment and paging).

The main functional entity in SWC is the SCF 14.

1) SCF: Every SWC-enabled eNB runs an SCF module with basic IP routing functionality. This is illustrated in the example of FIG. 1 where the base station 12 includes the SCF 14. Using the SCF 14 as an example, the SCF 14 contains basic IPv6 node and router functionalities that provide simple connectivity through a transparent SGi/Gi like reference point to the Internet. The SCF 14 advertises itself to all M-MTC devices (e.g., UEs 40) served by the current base station 12 (e.g., eNB) as the first-hop IP router (e.g., send solicited and unsolicited Router Advertisements) and M-MTC devices (e.g., UEs 40) are able to use IPv6 Stateless Address Auto-Configuration (SLAAC) (see [3]). The SCF 14 should also be able to relay or respond to Dynamic Host Configuration Protocol version 6 (DHCPv6) requests from M-MTC devices (e.g., UEs 40) for other configuration options. Additionally, the SCF 14 enables the following services:

The SCF 14 maintains a table to map an M-MTC device (e.g., a UE 40) with its IPv6 address(es). As discussed below, when using IPv6, this mapping may be implemented as a mapping between an IPv6 address prefix assigned or otherwise provided to the M-MTC device and a cellular network identifier of the M-MTC device. Every M-MTC device will have a DRB set up for all the traffic generated by the MTC applications. Therefore, the SCF 14 has to map a DRB to the IP sessions of the device. For this, the SCF 14 maintains a mapping relation UE_ID↔IPv6 address (e.g., UE_ID↔IPv6 prefix), where UE_ID could include UE identifiers usually available on the eNB, such as Cell Radio Network Temporary Identifier (C-RNTI) that identifies a device in the cell, System Architecture Evolution (SAE)—Temporary Mobile Subscriber Identity (S-TMSI) or International Mobile Subscriber Identity (IMSI) (used in Radio Resource Control (RRC) connection requests), Evolved Universal Terrestrial Radio Access Network (E-UTRAN) Cell Global Identifier (ECGI), etc.

SCF routing intrinsically implements local breakout. In uplink, the SCF 14 ensures fast traffic steering for the DRB data associated to an SCF context of the UE 40 based on the IP header. The SCF context of the UE 40 is information that enables SWC for the UE 40 such as, e.g., information that enables routing of IP packets received by the base station 12 to the UE 40 and/or information that enables base station initiated paging of the UE 40 upon receiving an IP packet for the UE 40 at the base station 12. As discussed below in detail, the SCF context of the UE 40 comprises, once an IP address(es) is assigned to the UE 40, information that maps the IP address(es) of the UE 40 with a network identifier of the UE 40. In addition, once a data radio bearer is established for the UE 40, the SCF context of the UE 40 is updated to include information that identifies the data radio bearer established for the UE 40. In downlink, the SCF 14 relays the data to the active DRB of the connected UE 40. The IP connectivity perceived by the UE 40 is depicted in FIG. 2, which shows an end-to-end path from the UE 40 to a Peer Entity (e.g., an AS 44) via the SCF 14. The SCF 14 forwards the traffic between the DRBs and the IP connections.

To support charging, monitoring, authentication, and authorization, a simplified auxiliary functionality module capable of supporting multiple SCFs 14 is envisioned. This module can be a standalone entity or co-located with an MME with appropriate bandwidth dimensioning. This module is referred to herein as a SCMS 36, which may also be referred to herein as MME' since the SCMS 36 performs some, but not all, MME functions.

2) SCMS: The following functionality is provided by the SCMS 36 in the proposal for SWC:
Non-Access-Stratum (NAS) signaling with eliminated EPS Session Management (ESM) procedures. This is because SWC no longer requires the EPS bearer management procedures as the interface to the S-GW 30 in SWC. An indication from the device (e.g., UE 40) or from the HSS 38 is used to use SWC for the MTC device and create a UE SCF context.

The interface with the HSS 38 for authentication and authorization purposes; the NAS security procedures are required in SWC.

The SCMS 36 performs UE reachability procedures through a paging procedure.

The SCMS 36 plays a role in deriving core-network assisted E-UTRAN parameters based on UE-MTC communication patterns from the HSS 38; this is specific to MTC (see 3GPP TS 23.682 V13.1.0).

The SCMS 36 triggers the setup of the UE SCF Context at the UE attachment point based on either: (1) an explicit indication from the UE via the initial attach request including a newly defined field for the SWC support within the UE Network Capability Information Element (IE); or (2) the subscription profile from the HSS indicating that the UE is SWC capable.

In the proceeding subsection, further SWC enhancements for M-MTC deployment are described.

Before the UE 40 can send or receive data from an AS 44 (the trigger may be for receiving or sending data), the UE 40 has to first acquire an IPv6 address. The SCF 14 at the base station 12 (e.g., eNB) steers the traffic based on the acquired IPv6 address. At initial attach, the UE 40—SCMS NAS signaling should indicate that the UE 40 is to be served within SWC and not the legacy core (i.e., the 3GPP EPC 16). There could be an explicit indication from the UE 40 via a newly defined UE Network Capability IE corresponding to SWC support. Alternatively, the SCMS 36 acquires this knowledge from the subscription profile of the UE 40 obtained from the HSS 38. However, unlike the conventional MME when performing the conventional initial attach procedure, the SCMS 36 does not trigger ESM procedures leading to EPS GTP-based bearer establishment. Once the DRB is established, the UE 40 auto-configures (e.g., using SLAAC) its IPv6 global address. The SCF 14 manages a pool of IPv6 prefixes following various policies set by operators. The SCF 14 becomes the first-hop router and sets the UE SCF context, which includes the mapping between UE identifiers available on the base station 12 (e.g., eNB) and the UE IPv6 address. The UE 40 is now ready to register its IP address with the AS 44. Depending on the UE technology, there are several ways the UE 40 can learn the AS IPv6 address. For instance, hardcoding this information in the UE 40, using a Fully Qualified Domain Name (FQDN), or via stateless DHCPv6 exchange with the SCF 14.

The UE SCF context is maintained while the UE 40 is idle (i.e., when the connection between the UE 40 and the base station 12 is released) and this is an acceptable tradeoff; an idle UE 40 that is directly triggered by the AS 44 using its global IPv6 address is also directly paged by the base station 12 (e.g., eNB) known to have the last valid UE SCF context. Downlink data or the trigger requests are buffered at the SCF 14/base station 12 (e.g., eNB) which pages the target UE 40 using, for example, its S-TMSI found in the UE SCF context. In case of failure to reach the UE 40, the SCMS 36 is notified to proceed with paging. The UE SCF context and its IPv6 address (and prefix) change if the UE 40 moves to a different base station (e.g., eNB). Upon a reattach to the mobile network, the UE 40, which may be an M-MTC device, must reregister with its AS 44 in order for the old context to be removed. RAN events such as link failures and retransmission indications which result in the UE 40 attaching to a new base station 12 (e.g., eNB) will trigger a new IPv6 auto-configuration (see [6]).

To support the networked society and cope with proliferation of applications supporting M-MTC devices, a simple, efficient, and scalable communication system is required. In this disclosure, a SWC approach based on IPv6 is proposed. The objective of the proposed architecture is to simplify and alleviate the signaling load through optimization of existing functions including an optimized IPv6 connectivity at the base station. The optimization takes into consideration M-MTC devices that have no mobility or to have low-mobility. Furthermore, the essence of the proposed solution is to support coexistence and interworking with the legacy mobile devices by a dual personality base station. The architecture and connectivity model are with description of main functional entities.

FIGS. 3A through 3F illustrate the conventional initial attach procedure as currently standardized by 3GPP. The steps are labelled steps 100 through 112. Since the conventional initial attach procedure is well known, the details are not discussed here in the text. However, it is important to note that, in the conventional initial attach procedure, EPS Session Establishment (110), particularly steps 110A through 110I, is performed in order to establish an S11 GPRS Tunneling Protocol for Control plane (GTP-C) session between the MME and the S-GW and an S5 GTP for Control Plane (GTP-C) session and an S5 bearer between the S-GW and the P-GW.

FIGS. 4A through 4F illustrate one example of an SWC initial attach procedure according to some embodiments of the present disclosure. Note that, for this discussion, the base station 12 is an eNB 12, but is not limited thereto. As illustrated, when the UE 40 powers on (step 200), the following procedures are performed: (1) Random Access (procedure 202 including steps 202A-202C), (2) ECM Connection Establishment (procedure 204 including steps 204A-204C), (3) Attach, Authentication, and Security Activation (procedure 206 including steps 206A-206U) including Mutual Authentication and NAS Security Setup, (4) Location Update (procedure 208 including steps 208A-208C), (5) DRB Setup (procedure 210 including steps 210A-210S) including AS Security Setup and DRB Establishment, (6) M-MTC registration with AS (step 212), and (7) IP Connection Establishment (step 214). The Random Access Procedure (procedure 202) and ECM Connection Establishment (204) are the same as that in the current/conventional 3GPP initial attach procedure of FIGS. 3A through 3F, which are well known. As such, the details of the Random Access Procedure (procedure 202) and ECM Connection Establishment (procedure 204) are not described herein.

After performing the Random Access Procedure (procedure 202) and ECM Connection Establishment (procedure 204), the Attach, Authentication, and Security Activation procedure (procedure 206) is performed. Importantly, unlike in the conventional initial attach procedure, ESM is not required for SWC. More specifically, the UE 40 sends an RRC Connection Setup Complete+NAS Attach Request to the eNB 12 (step 206A). Unlike the corresponding RRC Connection Setup Complete+NAS Attach Request in the conventional initial attach procedure, the RRC Connection Setup Complete+NAS Attach Request does not include a PDN Connectivity Request for ESM because ESM is not required.

The eNB 12 performs a MME or SCMS selection (step 206B) and sends an S1AP Initial UE Message including UE capabilities of the UE 40 to the selected MME or SCMS (step 206C). Here, the selected MME or SCMS is the SCMS 36. In other words, based on the UE capability (i.e., the capability of the UE 40 to support SWC), the eNB 12 selects the SCMS 36 rather than a conventional MME (e.g., MME 20). Notably, the UE capability may be obtained, e.g. from the UE 40. In some embodiments, the UE capabilities include some explicit or implicit indication that the UE 40 supports SWC. An S1 signaling connection between the eNB 12 and the SCMS 36 is established (step 206D) and an EPS Connection Management (ECM) connection between the UE 40 and the SCMS 36 is established (step 206E). Note that the ECM connection between the UE 40 and the SCMS 36 refers to a NAS connection between the UE 40 and the SCMS 36. Authentication and Security Activation procedures (steps 206F through 206U) including Mutual Authentication and NAS Security Setup procedures are then performed in the conventional manner.

A Location Update procedure (procedure 208) is then performed. The Location Update procedure (procedure 208) is similar to that performed in the conventional initial attach procedure other than, in this example, the Update Location Answer (step 208C) includes SWC support information. This SWC support information may include but is not limited to SWC capability (e.g., IPv6 and/or SLAAC capability), device type, traffic pattern and type including Uplink/Downlink dominant, idle timer value, mobility (mobile, nomadic or static), power source profile, etc. Note that SWC is, at least in some embodiments, transparent to the UE 40 and, in this regard, the SWC support information for the UE 40 includes capability information for features (e.g., IPv6 and/or SLAAC) needed for the UE 40 to utilize SWC. As illustrated, during the Location Update Procedure (procedure 208), the SCMS 36 sends a Diameter Update Location Request to the HSS 38 (step 208A). The HSS 38 updates the current location information (e.g., SCMS Identity (ID)) of the UE 40 (step 208B) and sends a Diameter Update Location Answer to the SCMS 36 (step 208C). The Diameter Update Location Answer includes the SWC support information for the UE 40, as discussed above.

At this point, the SWC initial attach procedure substantially departs from the conventional initial attach procedure. Specifically, an EPS Session Establishment procedure is not performed. Instead, a Default Radio Bearer Setup procedure (procedure 210) is performed without EPS Session Establishment. As illustrated, at this point in the SWC initial attach procedure, the SCMS 36 has everything needed to instruct the eNB 12 to start an initial context setup procedure. This includes the SWC support by the UE 40. The SCMS 36 sends an S1AP Initial Context Setup Request including the SWC support information to the eNB 12 (step 210A). In other words, the SCMS 36 sends an instruction to the eNB 12 to provide SWC to the UE 40 based on the SWC support information of the UE 40, where this instruction may include the SWC support information of the UE 40. Upon receiving the S1AP Initial Context Setup Request, the eNB 12 creates an SCF context of the UE 40 (step 210B). The SWC context may include some or all of the SWC support information. As discussed below, the SWC context is later updated to include, e.g., the IPv6 address of the UE 40 (e.g., IPv6 prefix of IPv6 addresses of the UE 40) and the UE identifier of the UE 40 (e.g., IMSI, S-TMSI, C-RNTI, Tracking Area ID (TAI), ECGI, Globally Unique Temporary ID (GUTI), etc.). The eNB 12 and the UE 40 then communicate to perform AS Security Setup (steps 210C-210G) and DRB Establishment (steps 210H-210J) in the conventional manner. However, once the DRB is established, the eNB 12 updates the SCF context of the UE 40 to include DRB information for the established DRB (step 210K). This DRB information includes, for example, a DRB ID of the DRB established for the UE 40.

The eNB 12 then sends an S1AP Initial Context Setup Response to the SCMS 36 (step 210L). The UE 40 sends an RRC Uplink (UL) Information Transfer message including an NAS EPS Mobility Management (EMM) Attach Complete to the eNB 12 (step 210M) and, in response, the eNB 12 sends an S1AP UL NAS Transport message including an EMM Attach Complete message to the SCMS 36 (step 210N).

In this example, in order for the UE 40 to obtain an IPv6 address, the UE 40 sends a Router Solicitation message to the SCF 14 (step 210O). The Router Solicitation message may be sent according to Request for Comment (RFC) 7066:2.2 and RFC 4861:6.3.7. The SCF 14 transmits a Router Advertisement including prefix information to the UE 40 (step 210P). Using the prefix information and SLAAC, the UE 40 generates an IPv6 address of the UE 40 (step 210Q). The UE 40 validates the IPv6 address via algorithm(s) similar to RFC 6059 (step 210R). The eNB 12 updates the SCF context of the UE 40 with the IPv6 address (i.e., the eNB 12 maps the IPv6 address to the DRB of the UE 40) (step 210S). The SCF 14 provides the IPv6 prefix and, therefore, the respective IPv6 addresses are associated to this UE 40. In other words, as discussed above, the IPv6 address stored in the SCF context of the UE 40 is more specifically, in some embodiments, the prefix of the IPv6 address included in the prefix information sent to the UE 40 in step 210P. Note that if the UE 40 generates multiple IPv6 addresses, e.g., for multiple different applications or services, then these IPv6 addresses will all include the same IPv6 prefix. Thus, by storing the IPv6 prefix of the UE 40 in the SCF context of the UE 40, the SCF 14 maps all of these IPv6 addresses of the UE 40 to the UE 40 and, therefore, the DRB of the UE 40.

The UE 40, which may be an M-MTC device, registers with the AS 44 (step 212). This step is implementation specific. An IP connection between the eNB 12 and the AS 44 is established (step 214). At this point, the SWC initial attach procedure is complete.

Figure 5A:
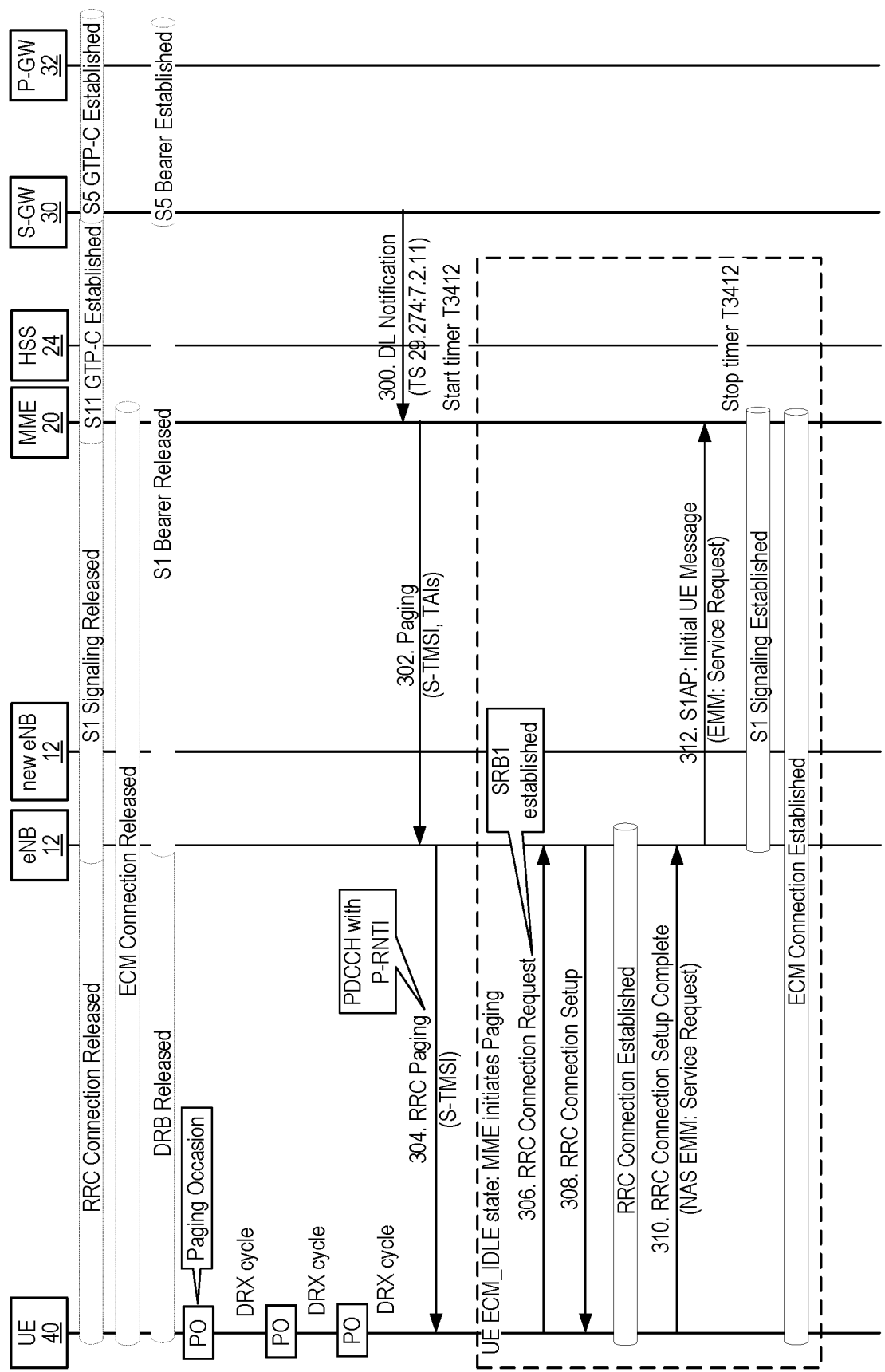
FIGS. 5A and 5B illustrate a conventional paging procedure as specified in 3GPP LTE standards.
Figure 5B:
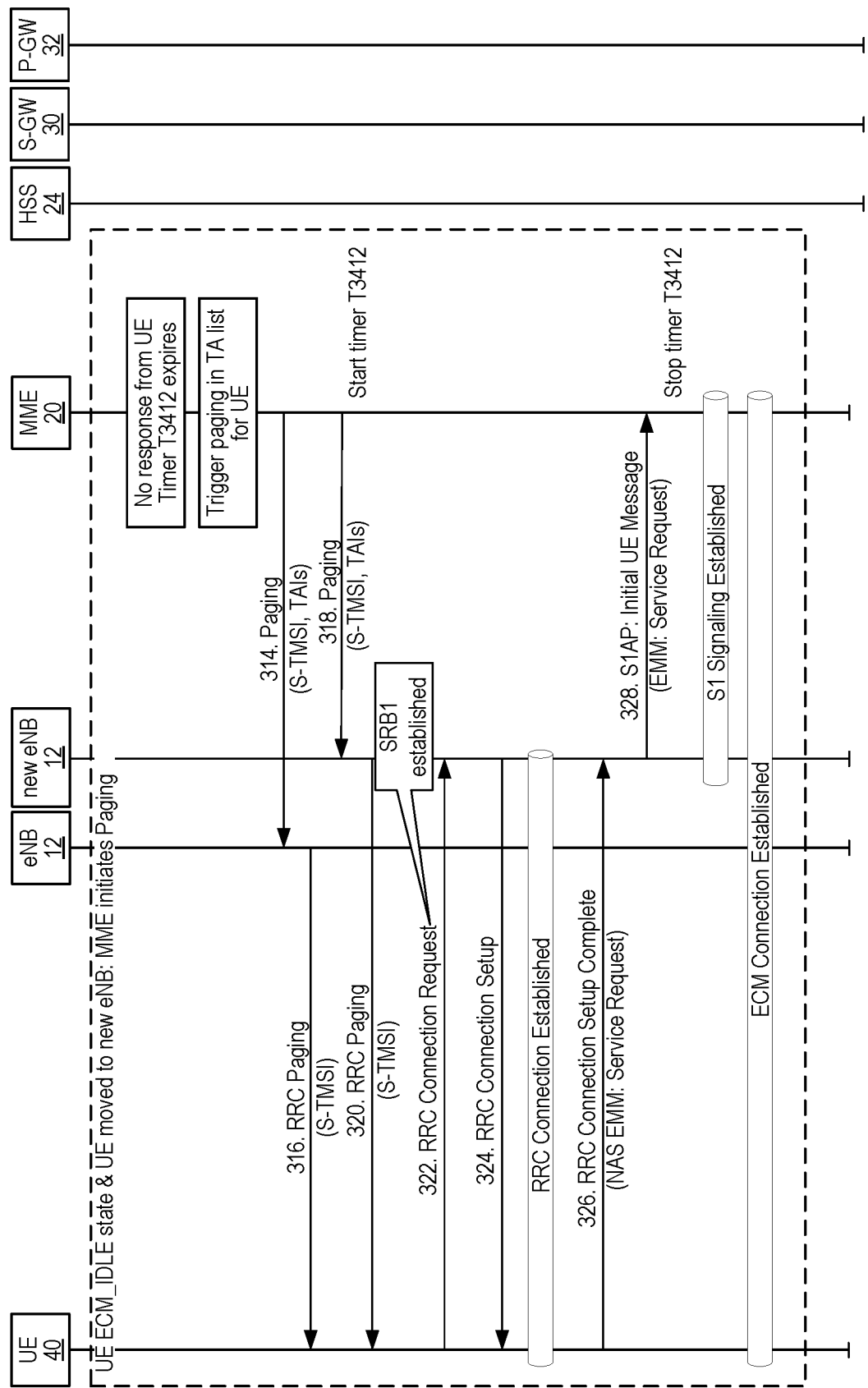

FIGS. 5A and 5B illustrate the conventional paging procedure as currently standardized by 3GPP. Since the conventional paging procedure is well known, the details are not discussed here in the text. However, it is important to note that, in the conventional paging procedure, paging is initiated by the MME 20. In particular, the MME 20 first receives a downlink notification and initiates paging by an eNB 12 (steps 300 and 302). In response, the eNB 12 sends a paging request (step 304). If the UE 40 receives the page, the UE 40 initiates an ECM procedure including RRC connection establishment, S1 signaling establishment, and ECM connection establishment (steps 306 through 312). If there is no response from the UE 40 within a predefined amount of time (T3412), the MME 20 then initiates paging by all eNBs in one or more Tracking Areas (TAs) in the TA list for the UE 40 and those eNBs send respective paging requests (steps 314 through 320). Upon receiving the page from one of the eNBs, the UE 40 initiates an ECM procedure including RRC connection establishment, S1 signaling establishment, and ECM connection establishment (steps 322 through 328).

Figure 6A:
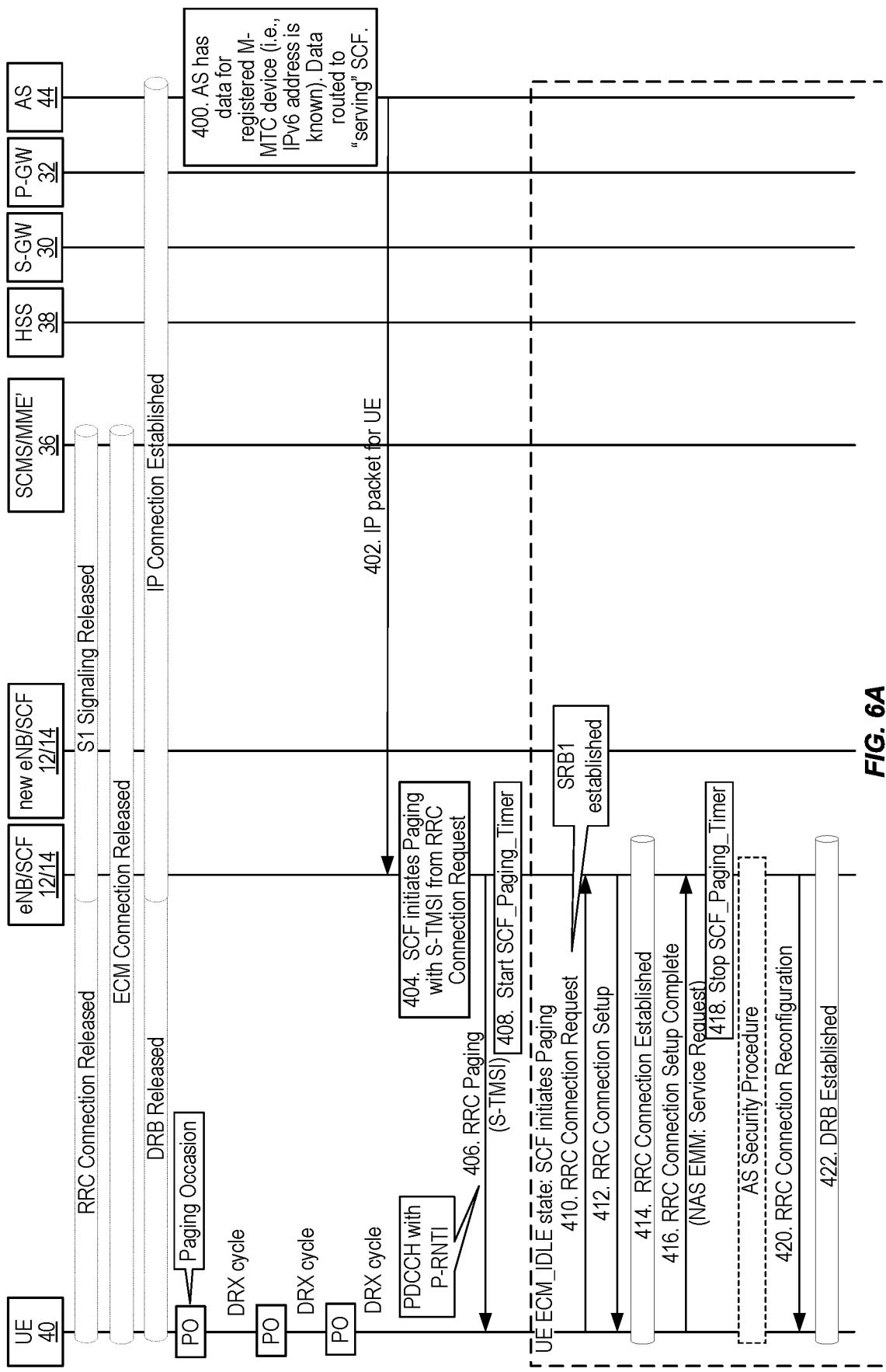
FIGS. 6A, 6B, and 6C illustrate an SWC paging procedure according to some embodiments of the present disclosure.
Figure 6B:
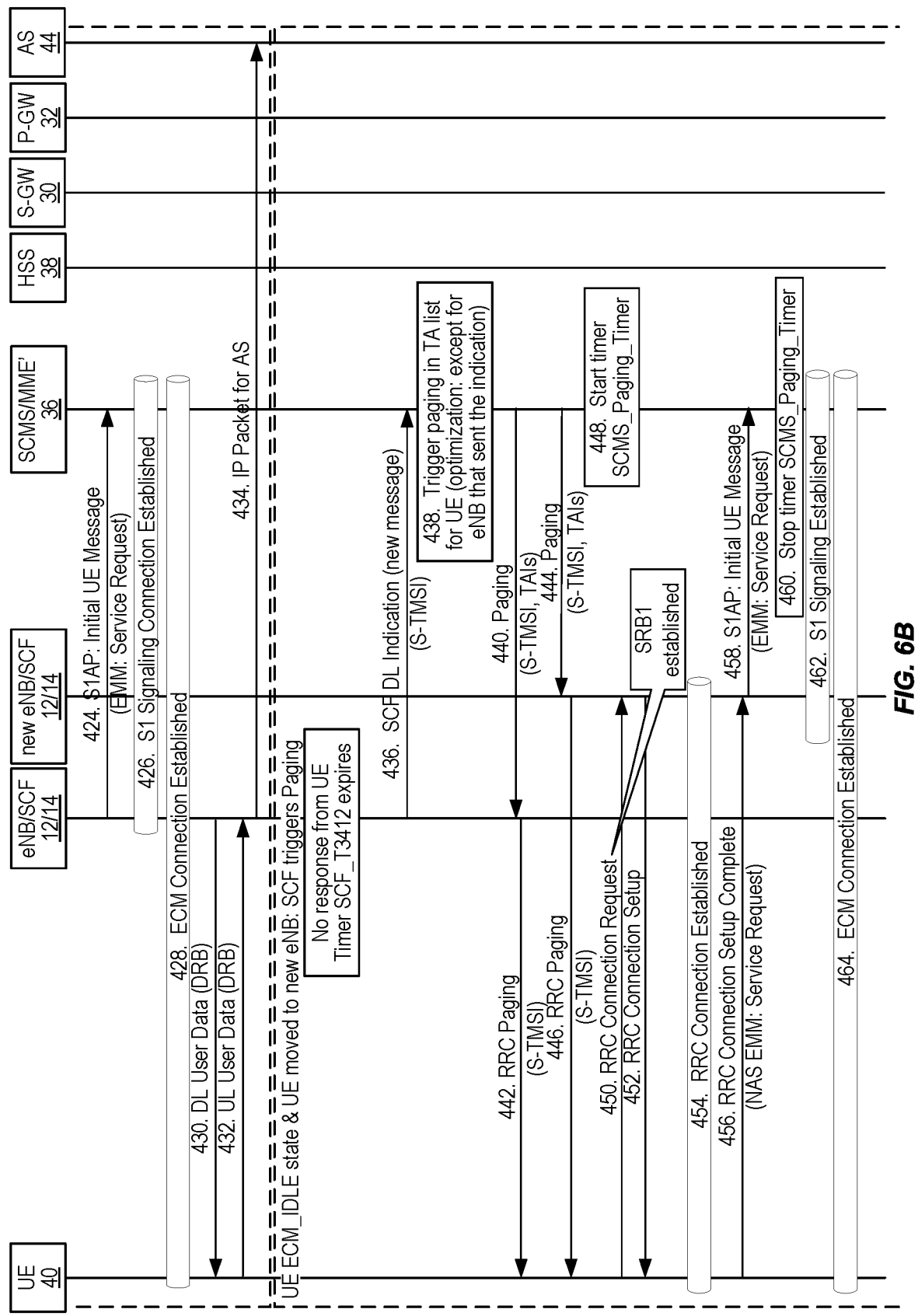
Figure 6C:
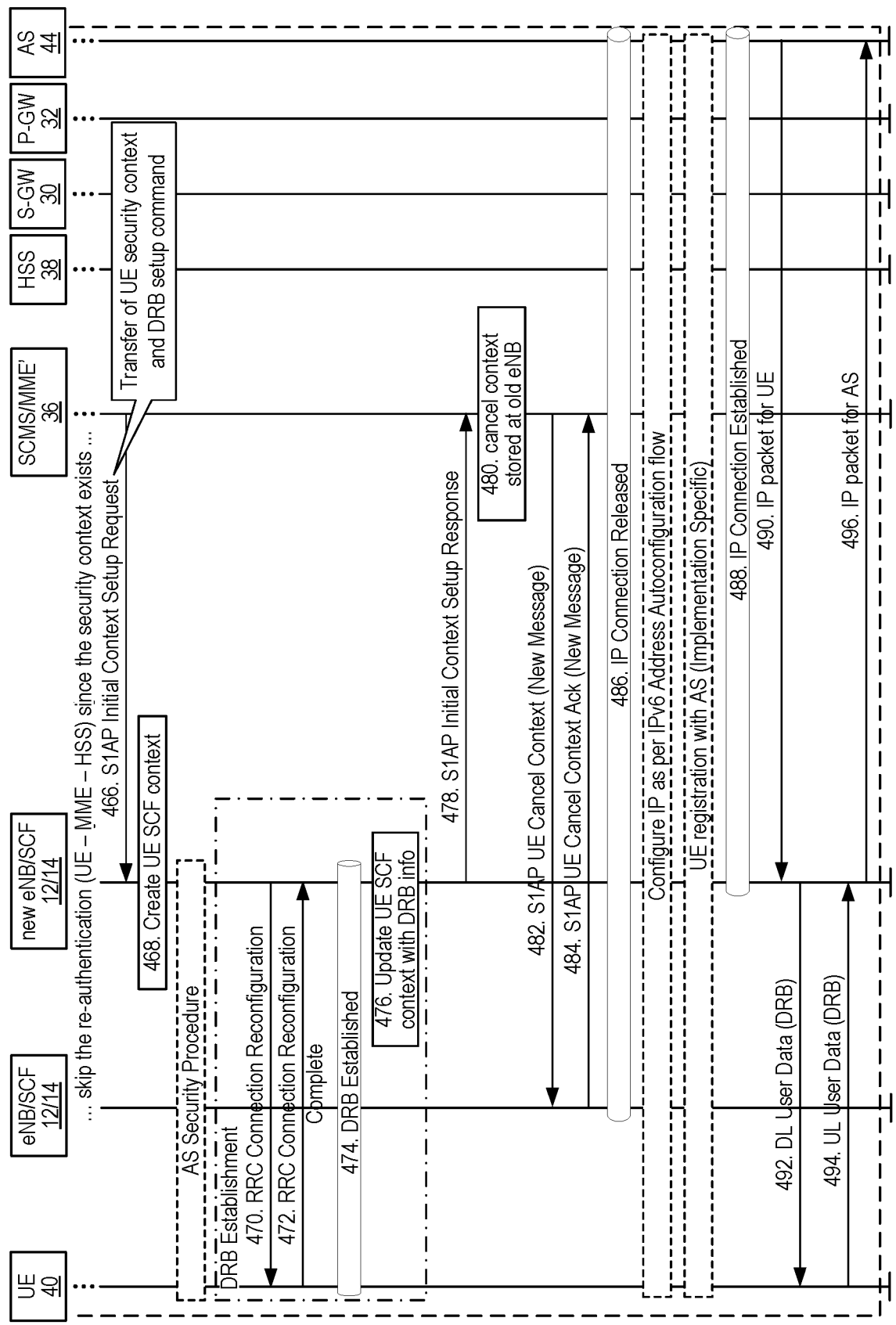

FIGS. 6A, 6B, and 6C illustrate one example of an SWC paging procedure according to some embodiments of the present disclosure. Note that, for this discussion, the base station 12 is an eNB 12, but is not limited thereto. Unlike the conventional paging procedure, paging is initiated by the eNB 12, and in particular by the SCF 14, upon receiving an IP packet for the UE 40 over the IP connection previously established between the eNB 12 and the respective AS 44 (steps 400-404). In particular, the AS 44 has data for a registered UE (step 400), which in this example is the UE

40. The AS 44 has the IP address of the UE 40. The AS 44 sends an IP packet to the IP address of the UE 40 (step 402). The IP packet is routed to the serving SCF, which in this example is the SCF 14. Upon receiving the IP packet for the UE 40 (step 402), the SCF 14 buffers the IP packet and maps the IPv6 address of the IP packet to determine, in this example, an S-TMSI of the UE 40 using the SCF context of the UE 40. In other words, in some embodiments, the SCF context of the UE 40 includes the IPv6 prefix of the IP address(es) of the UE 40 and the network ID of the UE 40 (e.g., the S-TMSI of the UE 40). Thus, upon receiving the IP packet from the AS 44, the SCF 14 determines that the IPv6 prefix of the IP packet matches the IPv6 prefix stored in the SCF context of the UE 40. Since the SCF context of the UE 40 also includes, in this example, the S-TMSI of the UE 40, the SCF 14 is then able to map the IPv6 address of the received IP packet to S-TMSI of the UE 40.

Upon receiving the IP packet and mapping the IP address to the S-TMSI of the UE 40, the eNB 12 and, in particular the SCF 14, initiates paging of the UE 40 (step 404). As such, the eNB 12 sends a paging request to the UE 40 (step 406). The paging request is then sent using the S-TMSI of the UE 40. Upon sending the paging request, the eNB 12 starts a predefined timer (step 408), which is referred to herein as SCF_Paging_Timer. FIGS. 6A and 6B illustrate two scenarios: (1) a scenario in which the SCF 14 (or eNB 12) receives a response from the UE 40 before the timer SCF_Paging_Timer has expired and (2) a scenario in which the SCF 14 (or eNB 12) does not receive a response from the UE 40 before the timer SCF_Paging_Timer has expired.

In the first scenario, the UE 40 receives the paging request from the eNB 12. Upon receiving the paging request, the UE 40 initiates an ECM procedure including RRC connection establishment, S1 signaling establishment, and ECM connection establishment (steps 410 through 428). Note that the SCF 14 stops the timer SCF_Paging_Timer upon receiving the RRC Connection Setup Complete message from the UE 40 (step 416). Note that with respect to step 424, both the eNB 12 and the SCMS save the S1 signaling connection context upon UE detach. It is this context that is used to re-establish the S1 signaling connection upon UE re-attach. This is similar to the information stored to support the RRC Suspend/Resume feature in 3GPP (see, e.g., 3GPP TR 23.720, Study on architecture enhancements for Cellular Internet of Things V13.0.0, 2016).

The SCF 14/eNB 12 then routes the buffered IP packet to the UE 40 (step 430). The UE 40 responds to the AS 44 by sending an IP packet containing data via an uplink data message (step 432). The SCF 14/eNB 12 then routes the IP packet to the AS 44 (step 434).

In the second scenario, the eNB 12 does not receive a response to the paging request from the UE 40 before the timer SCF_Paging_Timer expires. Upon the expiry of the timer SCF_Paging_Timer, the eNB 12 sends an SCF Downlink (DL) Indication message to the SCMS 36 (step 436). The SCF DL Indication message includes an ID of the UE 40, which in this example is the S-TMSI of the UE 40. Upon receiving the SCF DL Indication message, the SCMS 36 triggers paging of the UE 40 in one or more TAs in a TA list for the UE 40 and starts a timer SCMS_Paging_Timer (steps 438 through 448). Notably, in some embodiments, this paging may exclude the eNB 12 that has already paged the UE 40 in step 406. Upon receiving the paging request, the UE 40 initiates an ECM procedure including RRC connection establishment, S1 signaling establishment, and ECM connection establishment (steps 450 through 464). Note that the SCMS 36 stops the timer SCMS_Paging_Timer upon receiving the RRC Connection Setup Complete message from the UE 40 (step 460).

As further described in FIG. 6C, the SCMS 36 now has all the necessary information to instruct the new eNB 12/new SCF 14 to start the initial context setup procedure. The SCMS 36 sends an initial context setup message to the new eNB 12/new SCF 14 (step 466). Upon receiving the initial context setup message, the new eNB 12/new SCF 14 creates a UE SCF context for the UE 40, as described above (step 468). Note that the IPv6 address or IPv6 address prefix of the UE 40 will be added to the UE SCF context when available, which is implementation specific.

Before the setup of DRB, the eNB 12/SCF 14 initiates the AS security setup procedure, as described above, for secure communications over the radio link. The eNB 12/SCF 14 generates the AS security keys and selects the encryption and integrity algorithms. The eNB 12/SCF 14 sends the selected AS security algorithms to the UE 40. The UE 40 generates the AS keys and does an integrity check on the received security mode command message, as will be appreciated by one of ordinary skill in the art. The UE 40 confirms successful completion with a security mode complete message sent to the eNB 12/SCF 14. The ciphering and integrity setup is now complete for RRC messages and DRB.

As discussed above, the new eNB 12/SCF 14 initiates the establishment of a DRB connection with the UE 40. In other words, the eNB 12/SCF 14 establishes a DRB for the UE 40 (steps 470 through 474). Specifically, the eNB 12/SCF 14 allocates DRB identifiers for both uplink and downlink bearers and sends an RRC Connection Reconfiguration message to the UE 40 (step 470). This message includes an Attach Accept message destined for the UE 40. The UE 40 confirms successful completion with a Connection Reconfiguration Complete message that it sends to the new eNB 12/SCF 14 (step 472). The DRB is now established (step 474) and traffic can be exchanged between the UE 40 and the new eNB 12/SCF 14. The new eNB 12/SCF 14 updates the SCF context of the UE 40 to include an identifier(s) of the DRB(s) established for the UE 40 (step 476).

The new eNB 12/SCF 14 sends a response to the SCMS 36 (step 478). In addition, the new eNB 12/SCF 14 cancels the UE SCF context stored for the UE 40 at the old, or previously, eNB 12 (step 480) by sending a corresponding message to the old eNB 12 (step 482) the receipt of which confirmed by the old eNB 12 (step 484). The IP connection between the old eNB 12 and the AS 44 is released (step 486).

The IP address of the UE 40 is, as discussed above. The SCF context of the UE 40 stored at the new eNB 12/SCF 14 is updated to include the IPv6 address or IPv6 prefix of the IPv6 address configured for the UE 40. The UE 40 also registers with the AS 44 using its new IPv6 address, and the IP connection between the new eNB 12/SCF 14 is established (step 488).

The SCF 14/eNB 12 receives an IP packet for the UE 40 from the AS 44 (step 490). The SCF 14/eNB 12 maps the IP address of the received IP packet to the DRB of the UE 40 using the SCF context of the UE 40 and forwards the received IP packet to the UE 40 (step 492). The UE 40 responds to the AS 44 by sending an IP packet containing data via an uplink data message (step 494). The SCF 14/eNB 12 then routes the IP packet to the AS 44 (step 496).

Note that while the paging process described above is for the UE 40 when the UE 40 is in idle mode, the process, particularly steps 400 through 406 and steps 424 through 436, are equally applicable when the UE 40 is in RRC suspended state, as part of, e.g., the 3GPP Suspend/Resume procedure, as will be appreciated by one of ordinary skill in the art.

Figure 7:
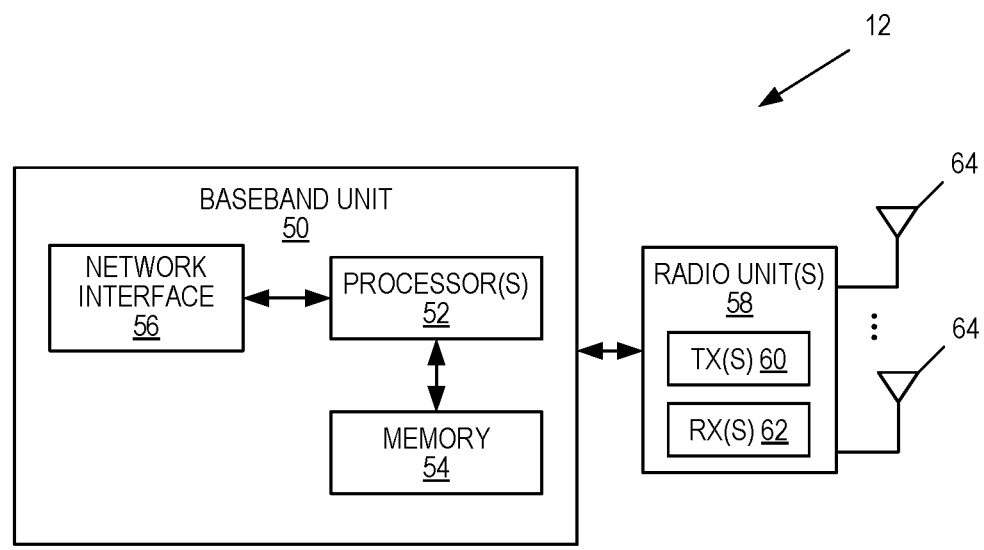
FIGS. 7 and 8 are block diagrams of example embodiments of a base station.

FIG. 7 is a block diagram of the base station 12 (e.g., eNB) according to some embodiments of the present disclosure. As illustrated, the base station 12 includes a baseband unit 50 that includes one or more processors 52 (e.g., one or more Central Processing Units (CPUs), Field Programmable Gate Arrays (FPGAs), Application Specific Integrated Circuits (ASICs), or the like), memory 54, and a network interface 56 (e.g., an Ethernet network interface) as well as a radio unit 58 that includes one or more transmitters 60 and one or more receivers 62 coupled to one or more antennas 64. The network interface 56 enables the base station 12 to communicate with, e.g., core network nodes (e.g., the SCMS 36). In some embodiments, the SCF 14 is implemented in software that is stored in the memory 54 and executed by the processor(s) 52; however, the SCF 14 is not limited thereto. For example, the SCF 14 may alternatively be implemented at the base station 12 as a combination of hardware and software. Further, in some alternative embodiments, the SCF 14 is implemented in or as a network node that is separate from, but communicatively coupled to, the base station 12.

In some embodiments, a computer program including instructions which, when executed by at least one processor, causes the at least one processor to carry out the functionality of the SCF 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 8:
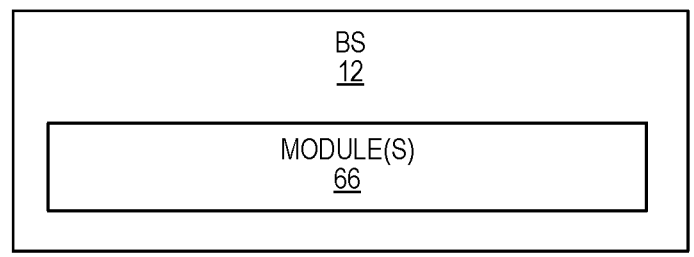

FIG. 8 illustrates the base station 12 (e.g., eNB) according to some other embodiments of the present disclosure. As illustrated, the base station 12 includes one or modules 66, each of which is implemented in software. The module(s) 66 operate to provide the functionality of the SCF 14 according to any of the embodiments described herein. For example, the module(s) 66 may include an attachment module that operates to provide the functionality of the SCF 14 with respect to the SWC initial attachment procedure (e.g., the procedure of FIGS. 4A through 4F). More specifically, in some embodiments, the module(s) 66 include a number of modules operable to perform respective functions during initial attachment of the wireless device 40. These modules include an establishing module, a first updating module, a providing module, and a second updating module. The establishing module is operable to establish a DRB between the base station 12 and the wireless device 40. The first updating module is operable to update a SCF context of the wireless device 40 to include information regarding the DRB established between the base station 12 and the wireless device 40 to thereby provide a mapping between the DRB and a cellular network ID of the wireless device 40. The providing module is operable to provide, to the wireless device 40, at least a portion of an IP address assigned to the wireless device 40. The second updating module is operable to update the SCF context of the wireless device 40 to include the at least a portion of the IP address of the wireless device 40 to thereby provide a mapping between the at least a portion of the IP address of the wireless device 40 and the cellular network ID of the wireless device 40.

The module(s) 66 may also include a paging module that operates to provide the functionality of the SCF 14 with respect to the SWC paging procedure (e.g., the procedure of FIGS. 6A and 6B). More specifically, in some embodiments, the base station 12 includes a receiving module and a transmitting module. The receiving module is operable to receive, from an application server, an IP packet for the wireless device 40, e.g., while the wireless device 40 is in idle mode or suspended mode. The transmitting module is operable to transmit a paging message for the wireless device 40 using a cellular network ID of the wireless device 40, wherein transmitting the paging message is initiated by the SCF 14 upon receiving the IP packet for the wireless device 40.

Figure 9:
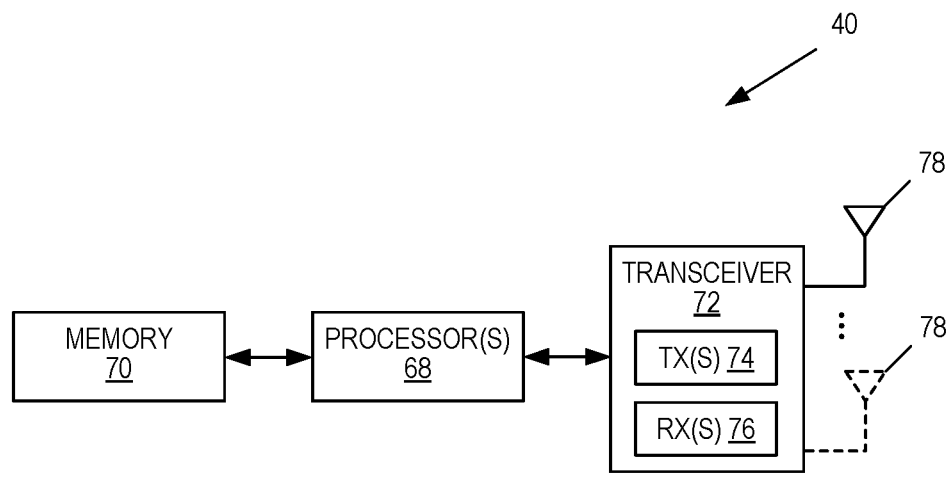
FIGS. 9 and 10 are block diagrams of example embodiments of a wireless device or UE.

FIG. 9 is a block diagram of the UE 40 (e.g., M-MTC device) according to some embodiments of the present disclosure. As illustrated, the UE 40 includes one or more processors 68 (e.g., one or more CPUs, FPGAs, ASICs, or the like), memory 70, and a transceiver 72 including one or more transmitters 74 and one or more receivers 76 coupled to one or more antennas 78. In some embodiments, the functionality of the UE 40 described herein is implemented in software that is stored in the memory 70 and executed by the processor(s) 68.

In some embodiments, a computer program including instructions which, when executed by at least one processor, causes the at least one processor to carry out the functionality of the UE 40 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 10:
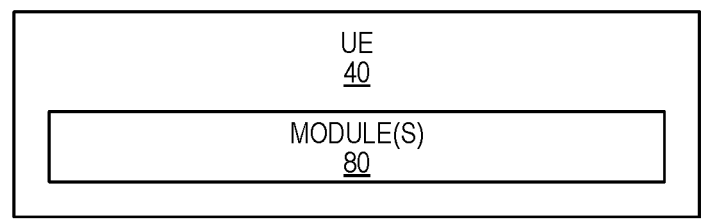

FIG. 10 illustrates the UE 40 (e.g., M-MTC device) according to some other embodiments of the present disclosure. As illustrated, the UE 40 includes one or modules 80, each of which is implemented in software. The module(s) operate to provide the functionality of the UE 40 according to any of the embodiments described herein. For example, the module(s) 80 may include an attachment module that operates to provide the functionality of the UE 40 with respect to the SWC initial attachment procedure (e.g., the procedure of FIGS. 4A through 4F). The module(s) 80 may also include a paging module that operates to provide the functionality of the UE 40 with respect to the SWC paging procedure (e.g., the procedure of FIGS. 6A and 6B).

Figure 11:
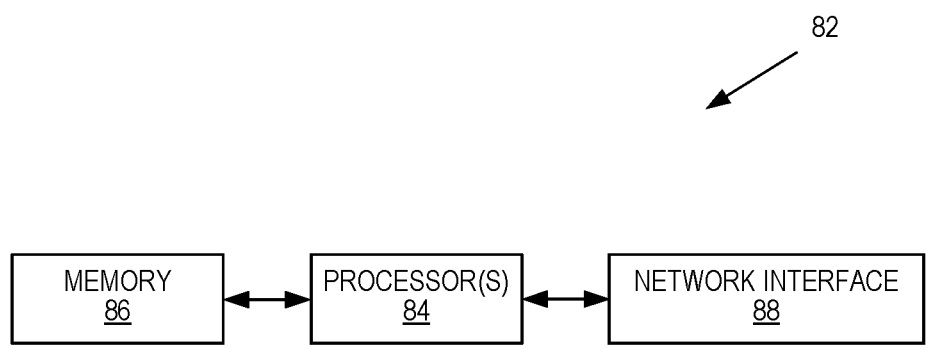
FIGS. 11 and 12 are block diagrams of example embodiments of a network node.

FIG. 11 is a block diagram of a network node 82 implementing the SCMS 36 according to some embodiments of the present disclosure. As illustrated, the network node 82 includes one or more processors 84 (e.g., one or more CPUs, FPGAs, ASICs, or the like), memory 86, and a network interface 88 that enables the network node 82 to communicate with other network nodes (e.g., other core network nodes and base stations). In some embodiments, the SCMS 36 is implemented in software that is stored in the memory 86 and executed by the processor(s) 84; however, the SCMS 36 is not limited thereto. For example, the SCMS 36 may alternatively be implemented as a combination of hardware and software.

In some embodiments, a computer program including instructions which, when executed by at least one processor, causes the at least one processor to carry out the functionality of the SCMS according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 12:
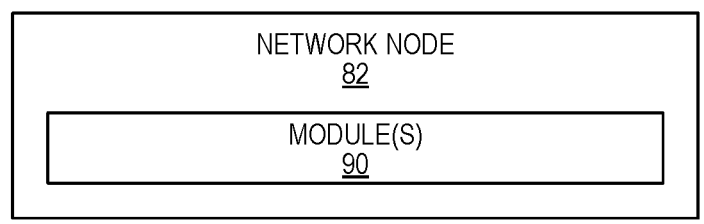

FIG. 12 illustrates the network node 82 according to some other embodiments of the present disclosure. As illustrated, the network node 82 includes one or modules 90, each of which is implemented in software. The module(s) 90 operate to provide the functionality of the SCMS 36 according to any of the embodiments described herein. For example, the module(s) 90 may include an attachment module that operates to provide the functionality of the SCMS 36 with respect to the SWC initial attachment procedure (e.g., the procedure of FIGS. 4A through 4F). In this regard, the module(s) 90 may include a number of modules operable to perform functions during an initial attachment procedure by which a wireless device (e.g., the UE 40) is attached to a base station 12. These modules 90 include an obtaining module and a sending module. The obtaining module is operable to obtain SWC support information of the wireless device. The sending module is operable to send an instruction to the base station 12 to provide SWC to the wireless device based on the SWC support information. For example, the instruction may be in the form of an initial context setup request comprising the SWC support information of the wireless device.

The module(s) 90 may also include a paging module that operates to provide the functionality of the SCMS with respect to the SWC paging procedure (e.g., the procedure of FIGS. 6A and 6B). In this regard, the module(s) 90 may include a number of modules operable to perform functions during a paging procedure by which a wireless device that supports SWC is paged. These modules 90 include a receiving module and a triggering module. The receiving module is operable to receive a message comprising a cellular network identifier of the wireless device from a base station upon unsuccessful paging of the wireless device by the base station. The triggering module is operable to, upon receiving the message, trigger paging of the wireless device by a plurality of base stations in one or more tracking areas in a tracking area list of the wireless device.

While not being limited thereto, some example embodiments of the present disclosure are described below.

Embodiment 0

A base station for a cellular communications network having a dual personality wherein it is capable of differentiating and steering traffic through the packet core network or directly to the peer entity.

Embodiment 1

A base station for a cellular communications network, comprising:
a Simplified Connectivity Function, SCF, module comprising Internet Protocol, IP, node and router functionality.

Embodiment 2

The base station of embodiment 1 wherein, via the SCF module, the base station is adapted to:
during initial attachment of a wireless device, obtain information that indicates that the wireless device supports Simplified Wireless Connectivity, SWC;
upon receiving the information that indicates that the wireless device supports SWC:
establish a Data Radio Bearer, DRB, between the base station and the wireless device;
obtain an IP address of the wireless device; and
maintain a mapping between the IP address of the wireless device and a cellular network identifier of the wireless device.

Embodiment 3

The base station of embodiment 2 wherein, via the SCF module, the base station is further adapted to create and maintain an SCF context of the wireless device, the SCF context comprising information regarding the DRB established between the base station and the wireless device and the IP address of the wireless device.

Embodiment 4

The base station of embodiment 3 wherein, via the SCF module, the base station is further adapted to maintain the SCF context of the wireless device even when the wireless device is in idle mode.

Embodiment 5

The base station of any of embodiments 2-4 wherein the IP address is an IP version 6, IPv6, address.

Embodiment 6

The base station of any of embodiments 2-5 wherein, via the SCF, the base station is further adapted to establish an IP connection between the base station and an end point (e.g., an AS) with which the wireless device is registered.

Embodiment 7

The base station of any of embodiments 1-6 wherein, via the SCF module, the base station is further adapted to:
receive an IP packet for the wireless device, while the wireless device is in idle mode; and
upon receiving the IP packet for the wireless device, transmitting a paging request for the wireless device and starting a timer.

Embodiment 8

The base station of embodiment 7 wherein, via the SCF module, the base station is further adapted to, upon expiry of the timer without receiving a response from the wireless device:
send a message comprising a cellular network identifier of the wireless device to a Simplified Connectivity Management Server, SCMS, such that the SCMS initiates paging of the wireless device by a plurality of base stations on one or more tracking areas in a tracking area list of the wireless device.

Embodiment 9

A base station for a cellular communications network, comprising:
means for providing Internet Protocol, IP, node and router functionality.

Embodiment 10

The base station of embodiment 9 wherein the means for providing IP node and router functionality comprises:

means for, during initial attachment of a wireless device, obtaining information that indicates that the wireless device supports Simplified Wireless Connectivity, SWC;
means for, upon receiving the information that indicates that the wireless device supports SWC:
establishing a Data Radio Bearer, DRB, between the base station and the wireless device;
obtaining an IP address of the wireless device; and
maintaining a mapping between the IP address of the wireless device and a cellular network identifier of the wireless device.

Embodiment 11

The base station of embodiment 10 further comprising a means for creating and maintaining an SCF context of the wireless device, the SCF context comprising information regarding the DRB established between the base station and the wireless device and the IP address of the wireless device.

Embodiment 12

The base station of embodiment 11 wherein the means for creating and maintaining the SCF context of the wireless device is adapted to maintain the SCF context of the wireless device even when the wireless device is in idle mode.

Embodiment 13

The base station of any of embodiments 10-12 wherein the IP address is an IP version 6, IPv6, address.

Embodiment 14

The base station of any of embodiments 10-13 wherein the means for providing IP node and router functionality further comprises a means for establishing an IP connection between the base station and an application service with which the wireless device is registered.

Embodiment 15

The base station of any of embodiments 9-14 wherein the means for providing IP node and router functionality further comprises:
a means for receiving an IP packet for the wireless device, while the wireless device is in idle mode; and
a means for, upon receiving the IP packet for the wireless device, transmitting a paging request for the wireless device and starting a timer.

Embodiment 16

The base station of embodiment 15 wherein the means for providing IP node and router functionality further comprises a means for, upon expiry of the timer without receiving a response from the wireless device:
sending a message comprising a cellular network identifier of the wireless device to a Simplified Connectivity Management Server, SCMS, such that the SCMS initiates paging of the wireless device by a plurality of base stations on one or more tracking areas in a tracking area list of the wireless device.

Embodiment 17

A method of operation of a base station of a cellular communications network, comprising:
during initial attachment of a wireless device, obtaining information that indicates that the wireless device supports Simplified Wireless Connectivity, SWC;
upon receiving the information that indicates that the wireless device supports SWC:
establishing a Data Radio Bearer, DRB, between the base station and the wireless device;
obtaining an Internet Protocol, IP, address of the wireless device; and
maintaining a mapping between the IP address of the wireless device and a cellular network identifier of the wireless device.

Embodiment 18

The method of embodiment 17 further comprising creating and maintaining an SCF context of the wireless device, the SCF context comprising information regarding the DRB established between the base station and the wireless device and the IP address of the wireless device.

Embodiment 19

The method of embodiment 18 wherein creating and maintaining the SCF context of the wireless device comprises maintaining the SCF context of the wireless device even when the wireless device is in idle mode.

Embodiment 20

The method of any of embodiments 17-19 wherein the IP address is an IP version 6, IPv6, address.

Embodiment 21

The method of any of embodiments 17-20 further comprising establishing an IP connection between the base station and an application service with which the wireless device is registered.

Embodiment 22

A method of operation of a base station in a cellular communications network, comprising:
receiving an Internet Protocol, IP, packet for a wireless device, while the wireless device is in idle mode; and
upon receiving the IP packet for the wireless device, transmitting a paging request for the wireless device and starting a timer.

Embodiment 23

The method of embodiment 22 further comprising, upon expiry of the timer without receiving a response from the wireless device sending a message comprising a cellular network identifier of the wireless device to a Simplified Connectivity Management Server, SCMS, such that the SCMS initiates paging of the wireless device by a plurality of base stations on one or more tracking areas in a tracking area list of the wireless device.

Embodiment 24

A network node in a core network of a cellular communications network, comprising:
a network interface;
one or more processors; and
memory containing software executable by the one or more processors whereby the network node is operable to, during an initial attachment procedure by which a wireless device is attached to a base station:
obtain Simplified Wireless Connectivity, SWC, support information of the wireless device; and
send an initial context setup request comprising the SWC support information of the wireless device to the base station.

Embodiment 25

The network node of embodiment 24 wherein the network node is further operable to refrain from performing Evolved Packet System Session Management, ESM, during the initial attachment procedure by which the wireless device is attached to the base station.

Embodiment 26

A method of operation of a network node in a core network of a cellular communications network comprising:
during an initial attachment procedure by which a wireless device is attached to a base station:
obtaining Simplified Wireless Connectivity, SWC, support information of the wireless device; and
sending an initial context setup request comprising the SWC support information of the wireless device to the base station.

Embodiment 27

The method of embodiment 26 further comprising refraining from performing Evolved Packet System Session Management, ESM, during the initial attachment procedure by which the wireless device is attached to the base station.

Embodiment 28

A network node in a core network of a cellular communications network, comprising:
a network interface;
one or more processors; and
memory containing software executable by the one or more processors whereby the network node is operable to, during a paging procedure by which a wireless device that supports Simplified Wireless Connectivity, SWC, is paged:
receive a message comprising a cellular network identifier of the wireless device from a base station upon unsuccessful paging of the wireless device by the base station; and
upon receiving the message, trigger paging of the wireless device by a plurality of base stations in one or more tracking areas in a tracking area list of the wireless device.

Embodiment 29

The network node of embodiment 28 wherein the network node is further adapted to, upon receiving the message and triggering paging of the wireless device by the plurality of base stations, start a timer.

Embodiment 30

A method of operation of a network node in a core network of a cellular communications network, comprising:
during a paging procedure by which a wireless device that supports Simplified Wireless Connectivity, SWC, is paged:
receiving a message comprising a cellular network identifier of the wireless device from a base station upon unsuccessful paging of the wireless device by the base station; and
upon receiving the message, triggering paging of the wireless device by a plurality of base stations in one or more tracking areas in a tracking area list of the wireless device

Embodiment 31

The method of embodiment 30 further comprising, upon receiving the message and triggering paging of the wireless device by the plurality of base stations, starting a timer.

The following acronyms are used throughout this disclosure.
26B 26 Billion
3GPP Third Generation Partnership Project
5G Fifth Generation
AS Application Server
ASIC Application Specific Integrated Circuit
CPU Central Processing Unit
C-RNTI Cell Radio Network Temporary Identifier
DHCPv6 Dynamic Host Configuration Protocol version 6
DL Downlink
DRB Data Radio Bearer
ECGI Evolved Universal Terrestrial Radio Access Network Cell Global Identifier
ECM Evolved Packet System Connection Management
EMM Evolved Packet System Mobility Management
eNB Enhanced Node B
EPC Evolved Packet Core
EPS Evolved Packet System
ESM Evolved Packet System Session Management
E-UTRAN Evolved Universal Terrestrial Radio Access Network
FPGA Field Programmable Gate Array
FQDN Fully Qualified Domain Name
GPRS General Packet Radio Service
GTP General Packet Radio Service Tunneling Protocol
GTP-C General Packet Radio Service Tunneling Protocol for Control Plane
GUA Global Unicast Address
GUTI Globally Unique Temporary Identity
HSS Home Subscriber Server
ID Identity
IE Information Element
IMSI International Mobile Subscriber Identity
IoT Internet of Things
IP Internet Protocol
IPv6 Internet Protocol version 6
LTE Long Term Evolution
MBB Mobile Broadband
MME Mobility Management Entity
M-MTC Massive Machine Type Communication MTC Machine Type Communication
MTC-AAA Machine Type Communication Authentication, Authorization, and Accounting
MTC-IWF Machine Type Communication Interworking Function
NAS Non-Access-Stratum
NR New Radio
PCRF Policy, Charging, and Rules Function
PDCP Packet Data Convergence Protocol
PDN Packet Data Network
PDP Packet Data Protocol
PDU Protocol Data Unit
P-GW Packet Data Network Gateway
RAB Radio Access Bearer
RAN Radio Access Network
RFC Request for Comment
RLC Radio Link Control
RRC Radio Resource Control
SAE System Architecture Evolution
SCF Simplified Connectivity Function
SCMS Simplified Connectivity Management Server
SCS Service Capability Server
SDT Small Data Transmission
S-GW Serving Gateway
SLAAC Stateless Address Auto-Configuration
S-TMSI System Architecture Evolution Temporary Mobile
SWC Simplified Wireless Connectivity
TA Tracking Area
TAI Tracking Area Identity
TR Technical Report
TS Technical Specification
UE User Equipment
UL Uplink Those skilled in the art will recognize improvements and modifications the embodiments of the present disclosure. All such improvements and modifications are considered within the scope of the concepts disclosed herein.

[1] Ericsson Mobility Report, June 2015.
[2] NGMN Alliance, Next Generation Mobile Networks, White paper (2015).
[3] Narten, T., Thomson, S., and Jinmei, T., "IPv6 stateless address autoconfiguration," RFC 4862, September 2007.
[4] 3GPP TS 22.368, Service requirements for Machine-Type Communications (MTC); Stage 1 (Release 13). December 2014.
[5] 3GPP TS 23.682, Architecture enhancements to facilitate communications with packet data networks and applications (Release 13). March 2015.
[6] Krishnan, S., and G. Daley, Simple Procedures for Detecting Network Attachment in IPv6. No. RFC 6059. 2010.
[7] Ksentini, A., Taleb, T., Ge, X., and Honglin, H., "Congestion-aware MTC device triggering", In Communications (ICC), 2014 IEEE International Conference on (pp. 294-298).
[8] Korhonen, J., Savolainen, T., Wolfner, G., and Laganier, J., "Evolving the 3GPP bearer model towards multiple IPv6 prefixes and next-hop routers". Telecommunication Systems, 59(2), 193-209.
[9] Sama, M. R., Ben Hadj Said, S., Guillouard, K., and Suciu, L., "Enabling network programmability in LTE/EPC architecture using OpenFlow", In Modeling and Optimization in Mobile, Ad Hoc, and Wireless Networks (WiOpt), 2014 12th IEEE International Symposium on (pp. 389-396).
[10] Rajan, A. S., Gobriel, S., Maciocco, C., Ramia, K. B., Kapury, S., Singhy, A., and Janaz, R., "Understanding the bottlenecks in virtualizing cellular core network functions", In Local and Metropolitan Area Networks (LAN-MAN), 2015 IEEE International Workshop on (pp. 1-6).
[11] Taleb, T., and Ksentini, A., "On alleviating MTC overload in EPS". In Ad hoc Networks Journal (2014).
[12] OECD, Machine-to-Machine Communications: Connecting Billions of Devices OECD Digital Economy Papers 192, OECD Publishing, January 2012.
[13] AT&T Network-ready Devices. [Online]. Available from http://www.att.com/modules (last accessed: Jan. 8, 2016).

What is claimed is:

1. A method of operation of a base station in a cellular communications network, the method comprising:
during initial attachment of a wireless device:
establishing a Data Radio Bearer (DRB) between the base station and the wireless device;
updating a context of the wireless device to include information regarding the DRB established between the base station and the wireless device to thereby provide a mapping between the DRB and a cellular network identifier of the wireless device;
providing, to the wireless device, at least a portion of an Internet Protocol (IP) address assigned to the wireless device; and
updating the context of the wireless device to include the at least a portion of the IP address of the wireless device to thereby provide a mapping between the at least a portion of the IP address of the wireless device and the cellular network identifier of the wireless device.

2. The method of claim 1, further comprising maintaining the context of the wireless device even when the wireless device is in idle mode.

3. The method of claim 1, wherein the IP address of the wireless device is an IP version 6 (IPv6) address.

4. The method of claim 1, wherein the at least a portion of the IP address of the wireless device is a prefix of the IPv6 address of the wireless device.

5. The method of claim 4, further comprising:
receiving, from the wireless device, a router solicitation message;
wherein providing the at least a portion of the IP address to the wireless device comprises transmitting, to the wireless device, a router advertisement comprising the prefix of the IPv6 address of the wireless device in response to receiving the router solicitation message.

6. The method of claim 1, further comprising:
receiving, from an application server, an IP packet;
determining that the IP packet is addressed to the wireless device based on the IP address comprised in the IP packet and the at least a portion of the IP address comprised in the context of the wireless device; and
transmitting the IP packet to the wireless device on the DRB established for the wireless device.

7. The method of claim 1, wherein the initial attachment does not include an Evolved Packet System (EPS) Session Management (ESM) procedure.

8. The method of claim 1, wherein establishing the DRB comprises performing a DRB setup procedure without Evolved Packet System (EPS) session establishment.

9. The method of claim 8, further comprising, during the initial attachment prior to establishing the DRB between the base station and the wireless device:

receiving a Radio Resource Control (RRC) connection request from the wireless device;

upon receiving the RRC connection request, sending an RRC connection setup message to the wireless device; and receiving an RRC connection setup complete message and Non-Access Stratum (NAS) attach request from the wireless device, wherein the NAS attach request does not include a Packet Data Network (PDN) connectivity request for Evolved Packet System (EPS) Session Management (ESM).

10. The method of claim 9, further comprising, during the initial attachment prior to establishing the DRB between the base station and the wireless device:

selecting a Simplified Connectivity Management Server (SCMS) for the wireless device, the SCMS supporting Simplified Wireless Connectivity (SWC);

sending, to the SCMS, an initial wireless device message to thereby establish a signaling connection between the base station and the SCMS, and an Evolved Packet System Connection Management (ECM) connection between the wireless device and the SCMS;

performing authentication and security activation procedures;

performing a location update procedure;

receiving, from the SCMS, an initial context setup request; and upon receiving the initial context setup request, creating the context for the wireless device.

11. The method of claim 1, further comprising:

receiving, from an application server, an IP packet for the wireless device; and transmitting a paging message for the wireless device using the cellular network identifier of the wireless device, wherein transmitting the paging message is initiated by the base station upon receiving the IP packet for the wireless device.

12. The method of claim 11, further comprising starting a timer upon transmitting the paging message.

13. The method of claim 12, further comprising stopping the timer upon receiving a response from the wireless device.

14. The method of claim 12, further comprising stopping the timer upon receiving a Radio Resource Control (RRC), connection setup complete message from the wireless device.

15. The method of claim 12, further comprising, upon expiry of the timer without receiving a response to the paging message from the wireless device, sending a message comprising the cellular network identifier of the wireless device to a Simplified Connectivity Management Server (SCMS).

16. The method of claim 12, further comprising, upon expiry of the timer without receiving a response to the paging message from the wireless device, sending a message comprising the cellular network identifier of the wireless device to a Simplified Connectivity Management Server (SCMS) such that the SCMS initiates paging of the wireless device by a plurality of base stations in one or more tracking areas in a tracking area list of the wireless device.

17. The method of claim 11, wherein receiving the IP packet for the wireless device comprises:

receiving the IP packet; and mapping an IP address of the IP packet to a network identifier of the wireless device based on a stored mapping between the at least a portion of the IP address of the wireless device and the network identifier of the wireless device.

18. The method of claim 17, wherein the IP address of the wireless device is an IP version 6 (IPv6) address, and the at least a portion of the IP address of the wireless device is a prefix of the IPv6 address of the wireless device.

19. A base station for a cellular communications network, the base station comprising:

at least one radio unit;

a network interface;

at least one processor; and memory comprising instructions executable by the at least one processor whereby the base station implements a function having Internet Protocol (IP) node and router functionality that is operable to:

during initial attachment of a wireless device:

establish a Data Radio Bearer (DRB) between the base station and the wireless device;

update a context of the wireless device to include information regarding the DRB established between the base station and the wireless device to thereby provide a mapping between the DRB and a cellular network identifier of the wireless device;

provide, to the wireless device, at least a portion of an IP address assigned to the wireless device; and update the context of the wireless device to include the at least a portion of the IP address of the wireless device to thereby provide a mapping between the at least a portion of the IP address of the wireless device and the cellular network identifier of the wireless device.

\* \* \* \* \*